US012634464B2

(12) United States Patent (10) Patent No.: US 12,634,464 B2
Choi et al. (45) Date of Patent: May 19, 2026

(54) DEEP-LEARNING-BASED COMPRESSION METHOD USING FREQUENCY DECOMPOSITION

(71) Applicant: InterDigital VC Holdings, Inc., Wilmington, DE (US)

(72) Inventors: Hyomin Choi, Los Altos, CA (US); Fabien Racape, Los Altos, CA (US); Shahab Hamidi-Rad, Los Altos, CA (US); Simon Feltman, Los Altos, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 99 days.

(21) Appl. No.: 18/855,278

(22) PCT Filed: Apr. 25, 2023

(86) PCT No.: PCT/US2023/019737
§ 371 (c)(1),
(2) Date: Oct. 8, 2024

(87) PCT Pub. No.: WO2023/215129
PCT Pub. Date: Nov. 9, 2023

(65) Prior Publication Data
US 2025/0247538 A1 Jul. 31, 2025

Related U.S. Application Data

(60) Provisional application No. 63/338,562, filed on May 5, 2022.

(51) Int. Cl.
*H04N 19/13* (2014.01)
*H04N 19/167* (2014.01)
(Continued)

(52) U.S. Cl.
CPC ........... *H04N 19/13* (2014.11); *H04N 19/167* (2014.11); *H04N 19/30* (2014.11); *H04N 19/60* (2014.11)

(58) Field of Classification Search
CPC ...... H04N 19/13; H04N 19/167; H04N 19/30; H04N 19/60
(Continued)

(56) References Cited

U.S. PATENT DOCUMENTS

| | | | | |
|---|---|---|---|---|
| 5,235,420 A | * | 8/1993 | Gharavi | H04N 19/1883 |
| | | | | 375/E7.032 |
| 5,864,780 A | * | 1/1999 | Kossentini | H04N 19/186 |
| | | | | 375/E7.068 |

(Continued)

OTHER PUBLICATIONS

Chen, et al., "Drop an Octave: Reducing Spatial Redundancy in Convolutional Neural Networks with Octave Convolution", arXiv:1904. 05049v3 (cs.CV), pp. 1-12, Aug. 18, 2019.
(Continued)

*Primary Examiner* — Jayanti K Patel
*Assistant Examiner* — Richard B Carter
(74) *Attorney, Agent, or Firm* — Xiaoan Lu

(57) ABSTRACT

In one implementation, we propose an end-to-end image video compression method that decomposes the spatial frequencies of the input content into a partitioned latent representation. Decomposed frequencies in the latent space are analyzed and grouped into separate latent representation or separate tensors, each tensor being jointly optimized to be decoded independently one from another. Therefore, the decoder can independently decode the tensors in a scalable manner to progressively reconstruct the input. This method enables quality scalability by progressively transmitting individual latent representations of decomposed frequency data, separated in the produced latent space. Furthermore, the quality scalability of region of interest (ROI) is enabled
(Continued)

by which the decoder takes only corresponding latent representations in the enhancement tensors as input together with latent representations already delivered to the decoder.

20 Claims, 21 Drawing Sheets

(51) Int. Cl.
H04N 19/30 (2014.01)
H04N 19/60 (2014.01)

(58) Field of Classification Search
USPC ........... 375/240.18, 240.12, E7.032, E7.068;
382/131
See application file for complete search history.

(56) References Cited

U.S. PATENT DOCUMENTS

| | | | | |
|---|---|---|---|---|
| 12,354,402 | B2 * | 7/2025 | Wasnik | ................ G06V 10/454 |
| 2008/0310506 | A1 * | 12/2008 | Xu | ....................... H04N 19/577 |
| | | | | 375/240.12 |
| 2016/0125599 | A1 * | 5/2016 | Stampanoni | ........... A61B 6/484 |
| | | | | 382/131 |
| 2017/0155924 | A1 * | 6/2017 | Gokhale | .............. H04N 19/184 |

OTHER PUBLICATIONS

Choi et al., "Frequency-aware Learned Image Compression for Quality Scalability", arxiv.org, Cornell University Libary, 201 Olin Library Cornell University Itacha, NY 14853, arXiv2301.01290v1, [eess.IV] Jan. 3, 2023. 6 pages.

Agarwal et al., "Deep Learning Based Image Compression in DWT Domain", 2022 8th International Conference on Advanced Computing and Communication Systems (ICACCS), IEEE, vol. 1, Mar. 25, 2022, pp. 445-453.

Ma et al., "iWave: CNN-Based Wavelet-Like Transform for Image Compression", IEEE Transactions on Multimedia, vol. 22, No. 7, pp. 1667-1679, Jul. 2020.

He et al., "An Enhanced Multi-frequency Learned Image Compression Method", in Pattern Recognition and Computer Vision: 4th Chinese Conference, PRCV 2021, Beijing, China, Oct. 29-Nov. 1, 2021, Proceedings, Part III 4, pp. 189-200. Springer International Publishing.

Yang et al., "Deep Image Compression in the Wavelet Transform Domain Based on High Frequency Sub-Band Prediction", IEEE Access, vol. 7, Apr. 16, 2019, 14 pages.

Ma et al., "End-to-End Optimized Versatile Image Compression With Wavelet-Like Transform", IEEE Transactions on Pattern Analysis and Machine Intelligence, vol. 44, No. 3, Mar. 2022, 17 pages.

Balle et al., "Variational Image Compression with a Scale Hyperprior", Cornell University Library, Electrical Engineering and Systems Science, Image and Video Processing, arXiv: 1802.01436v2, May 1, 2018, 23 pages.

Cui et al., "G-VAE: A Continuously Variable Rate Deep Image Compression Framework", arXiv preprint arXiv: 2003.02012 2.3 (2020), pp. 1-8.

Minnen et al., "Joint Autoregressive and Hierarchical Priors for Learned Image Compression", Advances in Neural Information Processing Systems 31, arXiv:1809.02736v1 (cs.CV), pp. 1-22, Sep. 8, 2018.

Balle et al., "Density Modeling of Images Using a Generalized Normalization Transformation", arXiv: 1511.06281v4 (cs, LG), pp. 1-14, Feb. 29, 2016.

Shi et al., "Real-Time Single Image and Video Super-Resolution Using an Efficient Sub-Pixel Convolutional Neural Network", arXiv:1609.05158v2 (cs.CV), pp. 1-10, Sep. 23, 2016.

* cited by examiner

FIG. 4A $$X \in \mathbb{R}^{C \times H \times W}$$

FIG. 6A

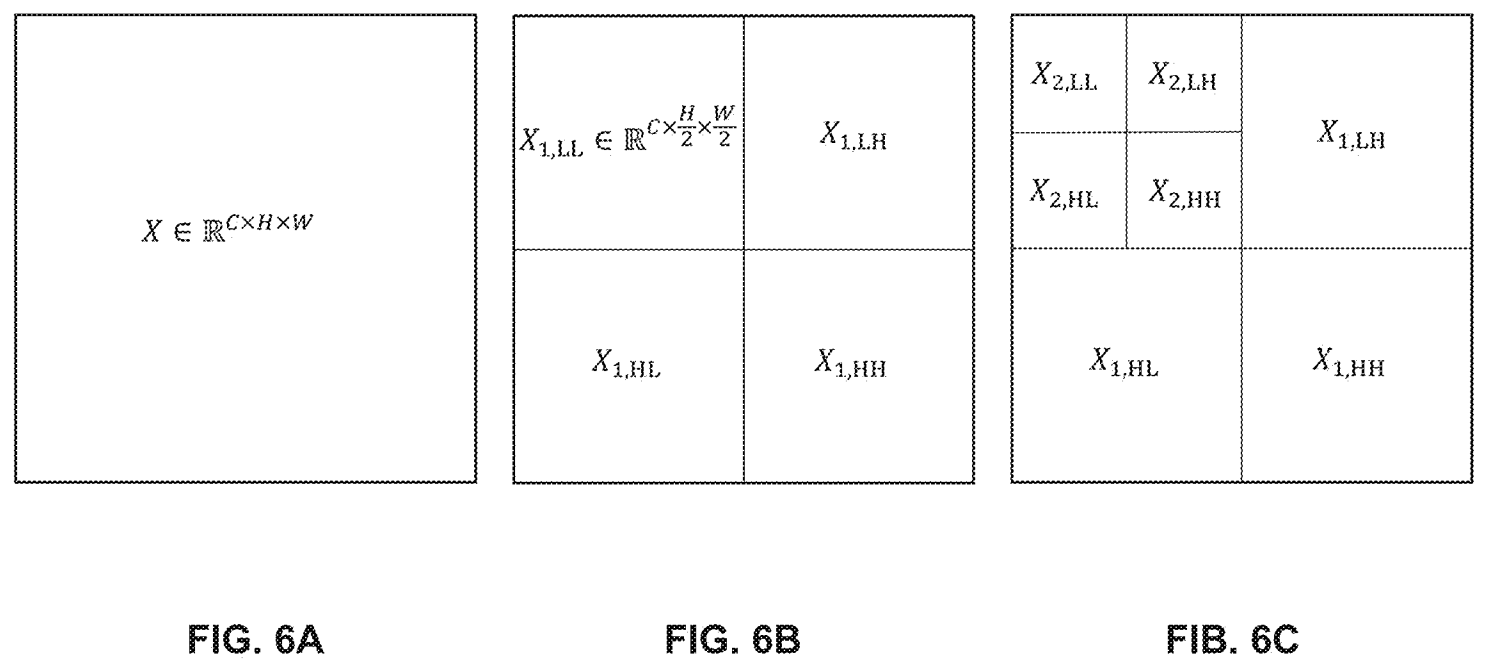

$$X_{1,LL} \in \mathbb{R}^{C \times \frac{H}{2} \times \frac{W}{2}}$$

| $X_{1,LH}$ | | $X_{1,HH}$ |
| --- | --- | --- |
| $X_{1,HL}$ | | |

FIG. 6B

| $X_{2,LL}$ | $X_{2,LH}$ | $X_{1,LH}$ |
| --- | --- | --- |
| $X_{2,HL}$ | $X_{2,HH}$ | |
| $X_{1,HL}$ | | $X_{1,HH}$ |

FIB. 6C

DEEP-LEARNING-BASED COMPRESSION METHOD USING FREQUENCY DECOMPOSITION

CROSS REFERENCE TO RELATED APPLICATIONS

This application is a U.S. National Stage Application under 35 U.S.C. 371 of International Patent Application No. PCT/US2023/019737 filed Apr. 25, 2023, which is incorporated herein by reference in its entirety.

This application claims the benefit of U.S. Patent Application No. 63/338,562 filed May 5, 2022, which is incorporated herein by reference in its entirety.

TECHNICAL FIELD

The present embodiments generally relate to a method and an apparatus for compression of images and videos using Artificial Neural Network (ANN)-based tools.

BACKGROUND

In recent years, novel image and video compression methods based on neural networks have been developed. Contrary to traditional methods which apply pre-defined prediction modes and transforms, ANN-based methods rely on many parameters that are learned on a large dataset during a training stage, by iteratively minimizing a loss function. In the case of compression, the loss function is, for example, defined by the rate-distortion cost, where the rate stands for the estimation of the bitrate of the encoded bitstream and the distortion quantifies the quality of the decoded video against the original input. Traditionally the quality of the decoded input image is optimized, for example based on the measure of the mean squared error or an approximation of the human-perceived visual quality.

The Joint Video Exploration Team (JVET) between ISO/MPEG and ITU is currently studying ANN-based tools to replace some modules of the latest video coding standard H.266/VVC, as well as the replacement of the whole structure by end-to-end auto-encoder methods.

SUMMARY

According to one embodiment, a method of video encoding, comprising: decomposing at least a part of an image into a plurality of frequency groups, wherein a frequency group corresponds to a set of frequency bands; generating a respective latent representation in a latent space for each frequency group of said plurality of frequency groups; and entropy encoding one or more of said respective latent representations.

According to another embodiment, a method of video decoding, comprising: obtaining one or more latent representations in a latent space, wherein each of said one or more latent representations corresponds to a frequency group of one or more frequency groups, wherein a frequency group corresponds to a set of frequency bands; obtaining said one or more frequency groups from said one or more latent representations; and composing at least a part of an image from said one or more frequency groups.

According to another embodiment, an apparatus for video encoding is provided, comprising one or more processors and at least one memory coupled to said one or more processors, wherein said one or more processors are configured to: decompose at least a part of an image into a plurality of frequency groups, wherein a frequency group corresponds to a set of frequency bands; generate a respective latent representation in a latent space for each frequency group of said plurality of frequency groups; and entropy encode one or more of said respective latent representations.

According to another embodiment, an apparatus for video decoding is provided, comprising one or more processors and at least one memory coupled to said one or more processors, wherein said one or more processors are configured to: obtain one or more latent representations in a latent space, wherein each of said one or more latent representations corresponds to a frequency group of one or more frequency groups, wherein a frequency group corresponds to a set of frequency bands; obtain said one or more frequency groups from said one or more latent representations; and compose at least a part of an image from said one or more frequency groups.

One or more embodiments also provide a computer program comprising instructions which when executed by one or more processors cause the one or more processors to perform the encoding method or decoding method according to any of the embodiments described herein. One or more of the present embodiments also provide a computer readable storage medium having stored thereon instructions for video encoding or decoding according to the methods described herein.

One or more embodiments also provide a computer readable storage medium having stored thereon video data generated according to the methods described above. One or more embodiments also provide a method and apparatus for transmitting or receiving the video data generated according to the methods described herein.

BRIEF DESCRIPTION OF THE DRAWINGS

FIG. 4A illustrates a frequency analysis module, according to an embodiment.

FIG. 6A illustrates an example of input, that is divided into four frequency sub-bands by wavelet transform as illustrated in FIG. 6B, and $X_{1,LL}$ is further divided into four frequency sub-bands as illustrated in FIG. 6C.

are requested from the encoder based on inference results ran on $\hat{X}_0$ in the decoder, according to an embodiment.

are requested from the encoder based on inference results ran on $\hat{Z}_0$ in the decoder, according to an embodiment.

DETAILED DESCRIPTION

Figure 1:
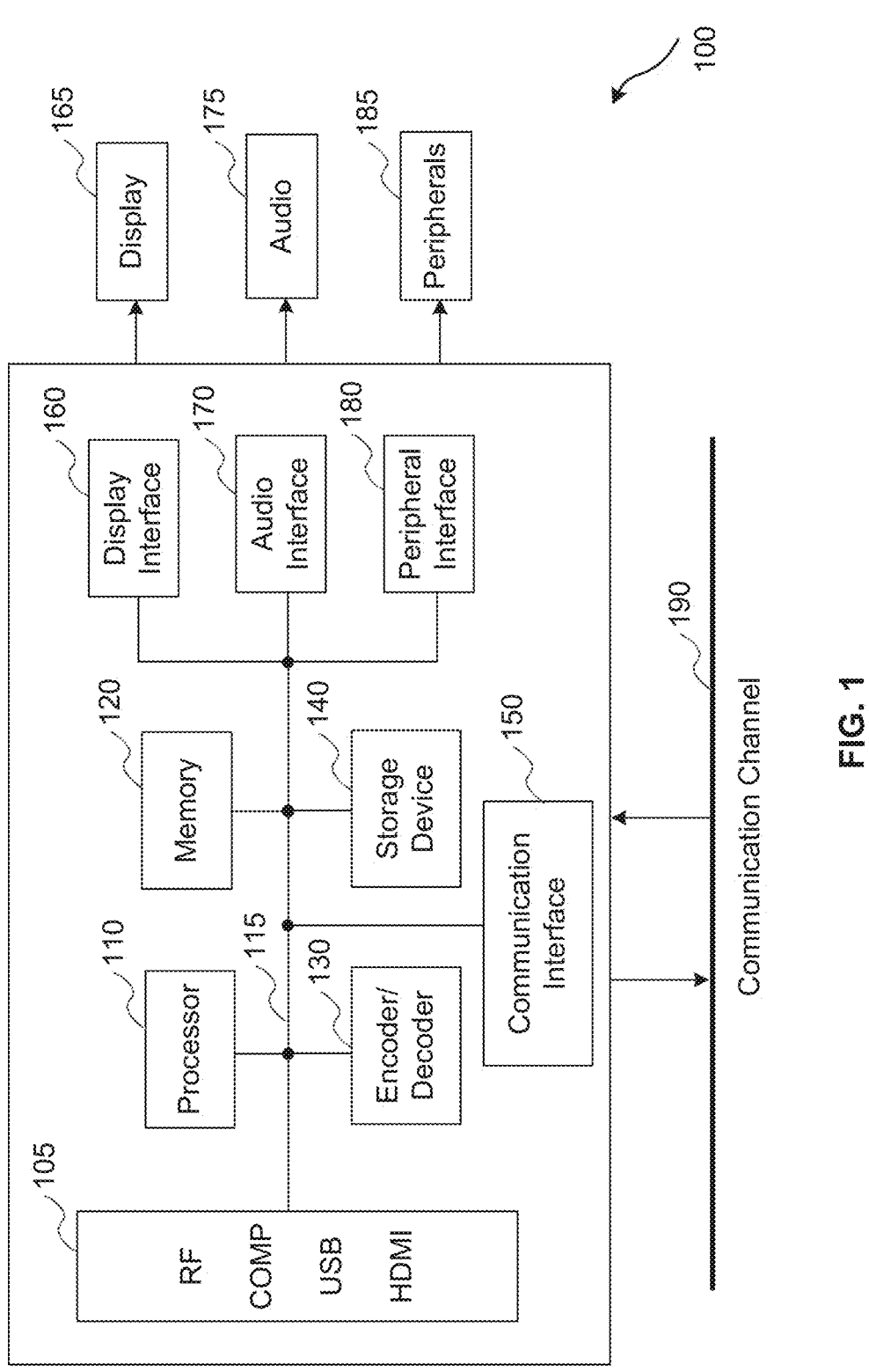
FIG. 1 illustrates a block diagram of a system within which aspects of the present embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV. Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Figure 2:
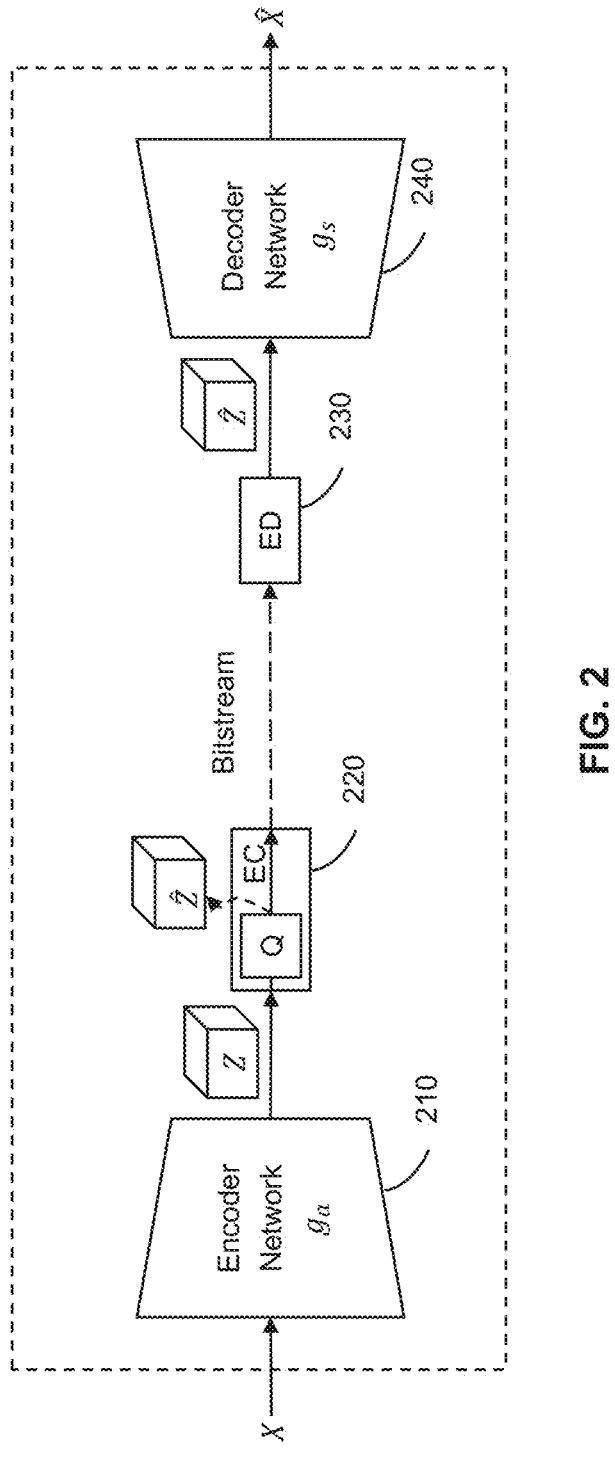
FIG. 2 illustrates an example of an end-to-end compression system.

FIG. 2 shows an example of an end-to-end compression system. Input X to the encoder part of the network can include:

an image or frame of a video;

a part of an image;

a tensor representing a group of images;

a tensor representing a part (crop) of a group of images.

In each case, the input can have one or multiple components, e.g.: monochrome, RGB or YCbCr components.

As shown in FIG. 2, input X is fed into the encoder network $g_a(\ )$ (210, also known as analysis transform). $g_a(\ )$ is usually a sequence of convolutional layers with activation functions. Large strides in the convolutions or space-to-depth operations can be used to reduce spatial resolution while increasing the number of channels. The encoder network can be seen as a learned transform. Note that space-to-depth operations can be implemented by reshaping and permutation, for example, a tensor of size (N, H, W) is reshaped and permuted to (N*2*2, H//2, W//2), where "//" represents integer division operator by discarding remainder.

The output of the analysis transform: $Z=g_a(X)$, the 3-way array or 3-dimensional tensor (referred to as a tensor), of latent variables or latent representation Z, is quantized (Q) and entropy coded (EC) (220) as a binary stream (bitstream) for storage or transmission. Note, in the following, we suppose that EC embeds the quantization operation (Q).

The bitstream is entropy decoded (ED, 230) to obtain $\hat{Z}$, the quantized version of Z. The decoder network $g_s(\ )$ (240, also known as synthesis transform) generates reconstructed input: $\hat{X}=g_s(\hat{Z})$, an approximation of the original X from the quantized latent representation $\hat{Z}$. $g_s(\ )$ is usually a sequence of up-sampling convolutions (e.g.: "deconvolutions" or convolutions followed by up-sampling filters) or depth-to-space operations. The decoder network can be seen as a learned inverse transform, or a denoising and generative transform.

More specifically, the encoder network (210) is usually composed of a sequence of convolutional layers with stride, allowing to reduce spatial resolution of the input while increasing the depth, i.e., the number of channels of the input. Pooling (e.g., Average Pooling, Max Pooling, etc.) or Squeeze operations (space-to-depth via reshaping and permutations) can also be used instead of stride convolutional layers. The encoder network can be seen as a learned transform.

The output of the analysis, mostly in the form of a 3-way array, referred to as a 3-D tensor, is called a latent representation or a tensor of latent variables. From a broader perspective, a set of latent variables constructs a latent space, which is also frequently used in the context of neural network-based end-to-end compression.

The latent representation is quantized and entropy coded for storage/transmission (220. The bitstream is the set of coded syntax elements and payloads of bins representing the quantized symbols, transmitted to the decoder.

The decoder first decodes (230) quantized symbols from the bitstream. The decoded latent representation is then transformed into pixels for output through a set of layers usually composed of (de-)convolutional layers (or depth-to-space squeeze operations). The decoder network (240) is thus a learned inverse transform operating on quantized coefficients. The output of the decoder is the reconstructed image or a group of images X.

Note that more sophisticated architectures exist, for example adding a "hyper-autoencoder" (hyper-prior) to the network to jointly learn the parameterized distribution of the latent representation as the output of the encoder. The methods proposed herein are not limited to the use of autoencoders. Any end-to-end differentiable codec can be considered.

Despite the fact there is no restriction on the input format of the autoencoders as stated earlier, most existing approaches take an entire image or frame as input to transform into the latent representation Z as illustrated in FIG. 2. In such cases, the latent representation represents a 3-dimensional tensor in the latent space by transforming the input image through (non-)linear transformation with a number of convolutional layers followed by activation. It implies that spatial redundancy is decomposed solely through the learned transformation operation, which limits not only the coding efficiency, but also the application of compression.

The proposed methods aim to improving rate-distortion performance for compressing images and/or videos using a frequency decomposition based end-to-end Neural-Network (NN). In addition, the proposed methods enable quality scalability or progressive decoding, e.g., in the context of variable quality regions of interest.

Since most state-of-the-art end-to-end NN-based image compression methods process entire images through learned non-linear transformations, there is no other way to reduce spatial redundancies but learn global optimal transforms to de-correlate the input content. The whole image is being transformed and compressed through a learned network; it is moreover challenging to control the quality of the reconstructed input locally.

On the contrary, most traditional hybrid encoders partition images into non-overlapping blocks of different sizes to spatially adapt to the content. They can then make decisions on prediction modes and transforms at block level to minimize spatial redundancies from the rate-distortion optimization perspective. For instance, transform coefficients for each block can be quantized with various quantization steps so that the reconstructed frame quality can be optimized for a target bitrate. Furthermore, by applying different quantization steps, encoders are able to preserve the texture of regions of interest adaptively. Besides, in the context of traditional image compression, the standard JPEG2000 stands out since it applies wavelet transforms to tiles, i.e. rectangular regions of the image, or the whole image which enables smooth progressive decoding to adaptively quantize coefficients across all spatial frequency sub-bands.

In this document, we first propose an end-to-end NN-based image compression method that involves frequency decomposition transforms like the wavelet transform, whose kernel coefficients can be learnable or predefined offline, which decompose spatial frequencies of the input content such that various degrees of frequencies are captured and grouped in the latent space to be encoded. This method enables progressively transmitting individual sets of decomposed frequencies, separated in the latent space and produced as separate tensors by the encoder. The set of latent representations or tensors or a stack of latent channels consisting of tensor(s) can then be decomposed and transmitted in separate bitstreams, thus enabling a sort of quality scalability. The proposed decoder network can use the bitstream representing the "base latent representation" or "base tensor" containing the low frequency data as input to reconstruct a lower quality representation of the input content. Additional frequency data can be decoded from the "enhancement latent representations" or "enhancement tensors" to achieve higher quality.

Note that in the context of traditional scalable video coding, standards like MPEG SVC (Scalable Video Coding) and MPEG SHVC (Scalable extension of the H.265/HEVC standard), a layer refers to one of the outputs of the scalable video coding framework, e.g., in the context of quality scalability, the base layer has the lowest quality, and can be refined using enhancement layers, which contain residual information to improve the quality of the reconstructed images. In the context of NN-based codecs, a layer already refers to an operation (convolution, fully connected, activation, etc.). In this document, the term "layer" is used for neural network operations, whereas scalable "layers" are denoted by their form, i.e., base, respectively enhancement, "latent representation" or "tensor".

Additionally, the proposed method enables a decoder to improve the quality of the reconstructed input only at specific regions of interest (ROI) (e.g., face, moving objects, etc.) by encoding additional enhancement latent representations containing corresponding localized information.

To specify a ROI to the decoder, the location information can be coded in the bitstream or can be derived from the decoder itself by performing a computer vision task using some latent representation arrived in advance (e.g., base latent representation) or the reconstructed input with lower quality as input.

As explained above, traditional image/video encoders partition input images into large blocks, also called coding tree units (CTUs). Each CTU is then sub-partitioned into smaller sub-blocks, depending on the effectiveness of the prediction and transforms to remove the redundancies in local textures. Each sub-block is coded using a prediction mode selected by the encoder among pre-defined normative modes, fixed linear transforms (e.g., DCT-II) and quantization, minimizing a rate-distortion criterion. Those processes make image/video coding very flexible in terms of local optimization with regards to bitrate and distortion.

Most end-to-end compression methods compress entire input images at once with learned analysis and synthesis nonlinear transforms. Particularly, these methods do not include adaptability mechanisms such as prediction modes and various quantization steps applied to transformed coefficients. Therefore, compression performance solely depends on the behavior of the learned nonlinear transform. Since the entire input images are processed by a unique learned transform, there is not much flexibility to adapt the quality of decoded ROI.

For the adaptive output bitstream, some solutions have been proposed though, like conditioning the transforms by rescaling the intermediary latent representation with learned coefficients (by layers) or learning normalization layers per bitrate and switching them on the fly. However, this is limited to the use case of targeting specific bitrates using the same model and can only affect the scaling of the latent representation of the whole input, which would have limited effects in improving the compression efficiency. Yet, there are few methods to adaptively decode ROI with the same model.

In this document, we propose an end-to-end image/video compression method that decomposes the spatial frequencies of the input content into a partitioned latent representation. Decomposed frequencies in the latent space are analyzed and grouped into separate latent representation or separate tensors, each tensor being jointly optimized to be decoded progressively. Therefore, the decoder can decode the tensors in a scalable manner to progressively reconstruct the input. When decoding the tensors, the tensors may be entropy decoded independently. This method enables quality scalability by progressively transmitting individual latent representations of decomposed frequency data, separated in the produced latent space. The proposed decoder network uses the base latent representation or base tensor as input to reconstruct lower quality and can potentially decode additional enhancement latent representation(s) or enhancement tensor(s) containing more frequency data to achieve higher quality.

Furthermore, the quality scalability of region of interest (ROI) is enabled by which the decoder takes only corresponding latent representations in the enhancement tensors as input together with latent representations already delivered to the decoder. The location of ROI can be specified to the decoder by explicitly signaling the position(s). Alternate ROI methods can be achieved at the decoder side by operating a computer vision algorithm using the reconstructed image from only the previously received latent representation as input or directly using the latent representation as input.

As mentioned above, we introduce an end-to-end NN-based compression method that analyzes spatial frequencies through learning process and groups corresponding latent representations in the latent space so that they can be split up and transmitted within separate bitstreams. These bitstreams can then later be decoded progressively in a scalable manner. Advantageously, spatial redundancy is reduced through an explicit analysis using a (learnable) frequency decomposition process, which helps to segregate and group relevant frequency data into multiple tensors or latent representations with regards to various perspectives (e.g., reconstruction quality and multi-task). In addition, the multiple latent representations can be decoded in a scalable manner. For example, the more latent representations with high-frequency data the decoder uses, the higher quality of input reconstruction. Moreover, it is also possible to locally enhance the quality of the reconstructed input by only using the part of latent representations corresponding to the location in the enhancement latent representations.

Progressive Coding in a Scalable Manner

Figure 3A:
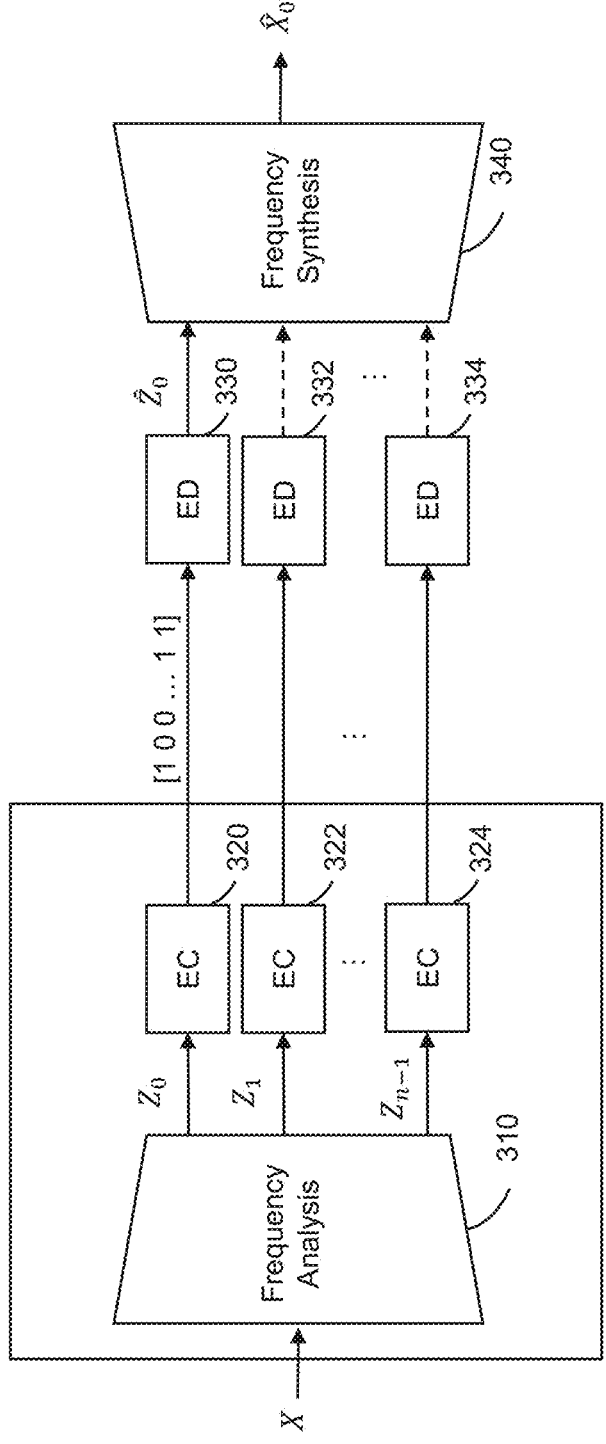
FIG. 3A illustrates the case when only $\hat{Z}_0$ is present in the bitstream.

In FIG. 3A, let X be the input image to the Frequency Analysis module (310) which outputs a set of latent representations $\{Z_0, Z_1, \ldots, Z_{n-1}\}$, where $Z_{i+1}$ generally corresponds to information with higher frequency than $Z_i$. Note that the $\{Z_j\}$ do not necessarily have the same dimension. Each $\hat{Z}_j$, corresponding to each respective $Z_j$ after quantization, is entropy coded (320, 322, 324) to form the bitstream, along with necessary metadata, which is transferred to the decoder.

At the decoder, the entropy decoder (330, 332, 334) outputs the $\hat{Z}_j$, containing compression noise coming from the quantization, which are reconstructed and used as input to the Frequency Synthesis module (340). In the proposed end-to-end method, it is not necessary to decode all the $\hat{Z}_j$ to start the reconstruction process. For instance, when only $\hat{Z}_0$ is available in the bitstream, the remaining latent representations carrying higher frequency information are padded with zeros as input to reconstruct $\hat{X}_0$ with minimum quality as shown in FIG. 3A. The quality of the reconstructed input depends on the coded information carried over corresponding latent representations, which is learned through an offline training process.

Figure 3B:
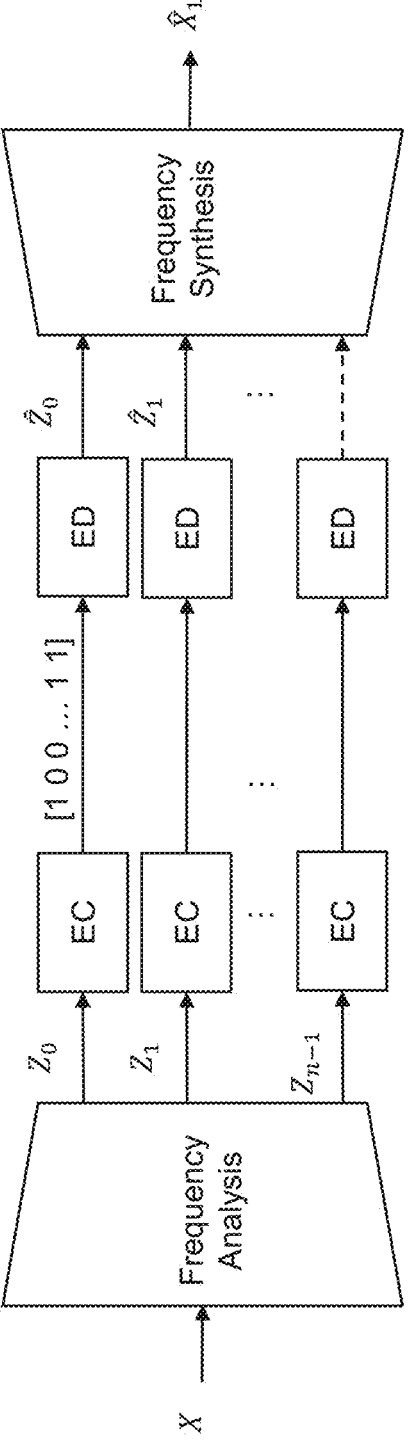
FIG. 3B illustrates the case when $\hat{Z}_0$ and $\hat{Z}_1$ are present in the bitstream.
Figure 3C:
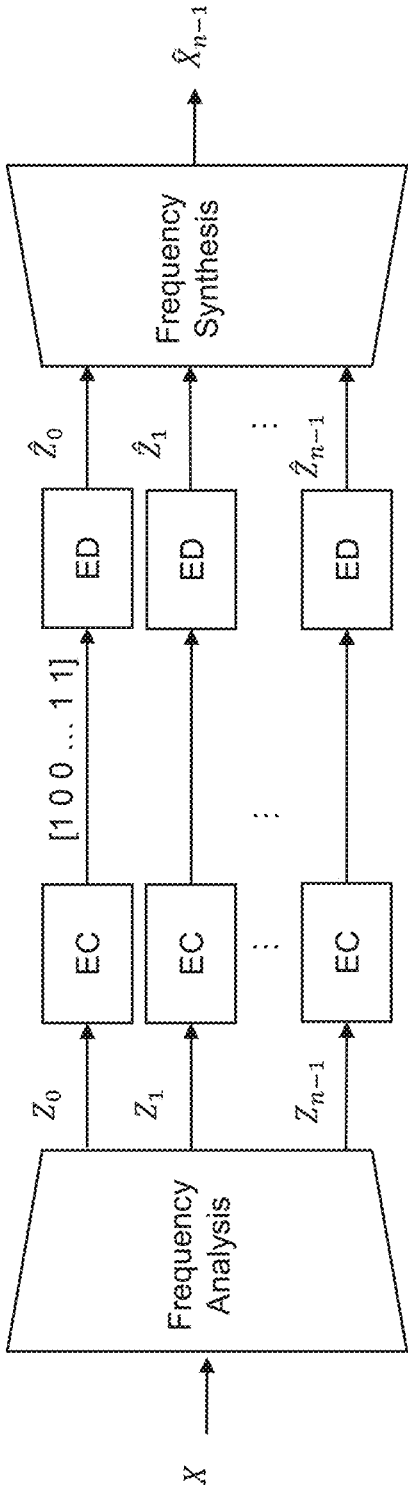
FIG. 3C illustrates the whole set of the latent representations $\{\hat{Z}_0, \hat{Z}_1, \ldots, \hat{Z}_{n-1}\}$ are available in the bitstream.

FIG. 3B shows the case when the entropy coded $\hat{Z}_0$ and $\hat{Z}_1$ are present in the bitstream and entropy decoded. The decoder then reconstructs $\hat{X}_1$, which presents the higher quality of reconstructed input, for example, in terms of PSNR and/or MS-SSIM, than $\hat{X}_0$. As shown in FIG. 3C, the best quality of the reconstructed input is achieved when the whole set of the latent representations $\{\hat{Z}_0, \hat{Z}_1, \ldots, \hat{Z}_{n-1}\}$ are available as input. Therefore, the decoder reconstructs $\hat{X}_{n-1}$ with the highest quality.

Figure 4A:
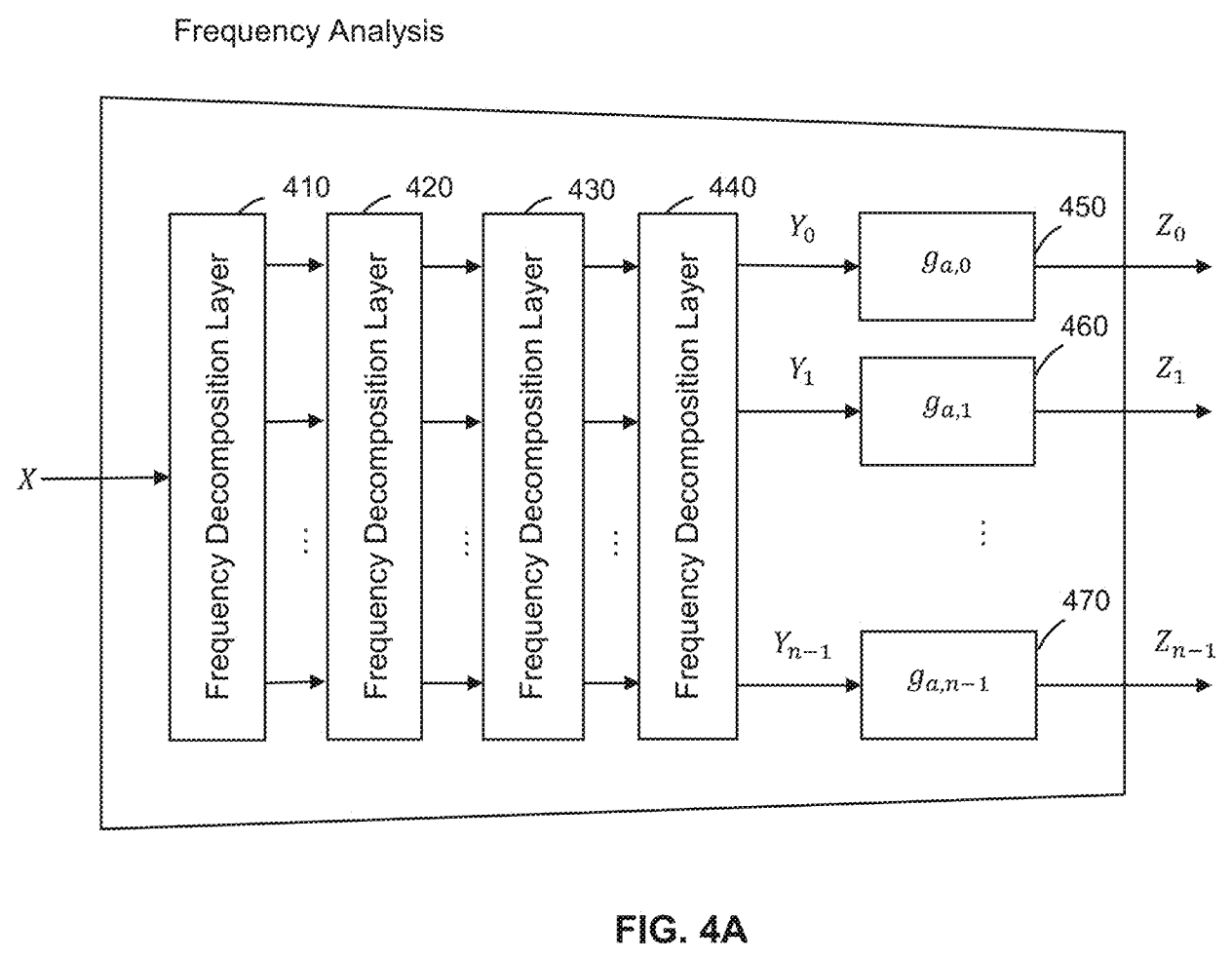

FIG. 4A presents an embodiment of the encoder which takes an image X as input and outputs a set of latent representations $\{Z_0, Z_1, \ldots, Z_{n-1}\}$. Specifically, the input goes through Frequency Decomposition (FD) layers (410, 420, 430, 440), which decompose spatial frequencies and group them into multiple levels $\{Y_0, Y_1, \ldots, Y_{n-1}\}$. Then, each group of frequency data $(Y_j)$ can be further transformed into latent representations $\{Z_0, Z_1, \ldots, Z_{n-1}\}$ by corresponding analysis transform $g_{a,k}(\ )$ (450, 460, 470), where $k=\{0, 1, \ldots, n-1\}$. Generally, a group of frequency data (frequency group) can be considered as a set of multiple frequency bands. For example, $Y_0$ contains low-frequency like bands whereas $Y_1$ includes relatively high-frequency like bands. Ideally there is no redundant frequency information between these two frequency groups. It should be noted that four frequency decomposition layers are illustrated in FIG. 4, however, any number of FD layers can be used.

Additional neural networks such as hyper-prior encoder/decoder and auto-regression models can also further process the latent representations $\{Z_0, Z_1, \ldots, Z_{n-1}\}$ in order to improve coding efficiency.

Figure 4B:
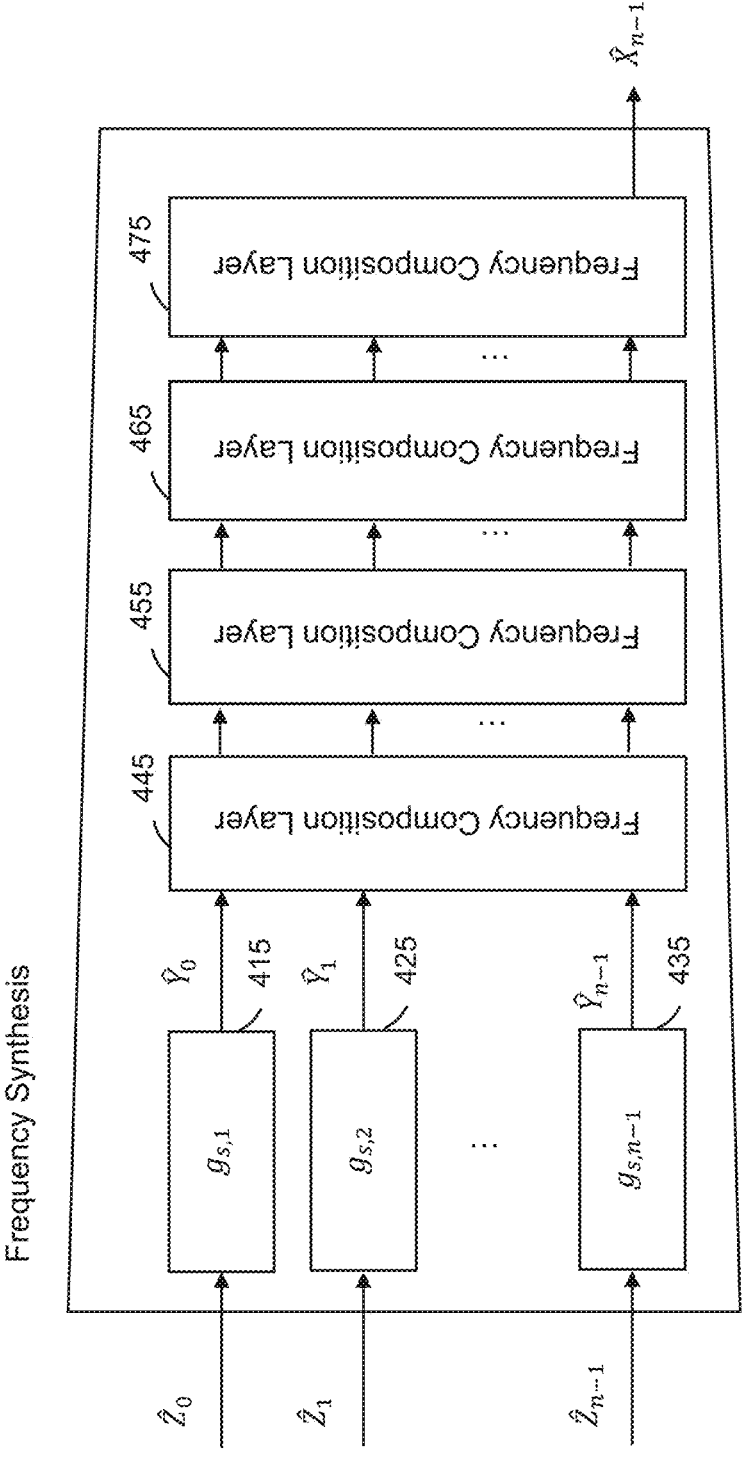
FIG. 4B illustrates a frequency synthesis module, according to an embodiment.

FIG. 4B presents the decoder as an inverse process of the encoder shown in FIG. 4A. The decoder takes entropy decoded $\{\hat{Z}_0, \hat{Z}_1, \ldots, \hat{Z}_{n-1}\}$ as input. For each reconstructed latent representation $\hat{Z}_k$, corresponding synthesize transform $g_{s,k}(\ )$ (415, 425, 435) synthesizes it into $\hat{Y}_k$ individually. Each reconstructed group of frequency data $\{\hat{Y}_0, \hat{Y}_1, \ldots, \hat{Y}_{n-1}\}$ is used as input to Frequency Composition (FC) layers (445, 455, 465, 475). Then the last Frequency Composition layer outputs the reconstructed input $\hat{X}_{n-1}$, which is the output of the decoder as well.

Figure 5:
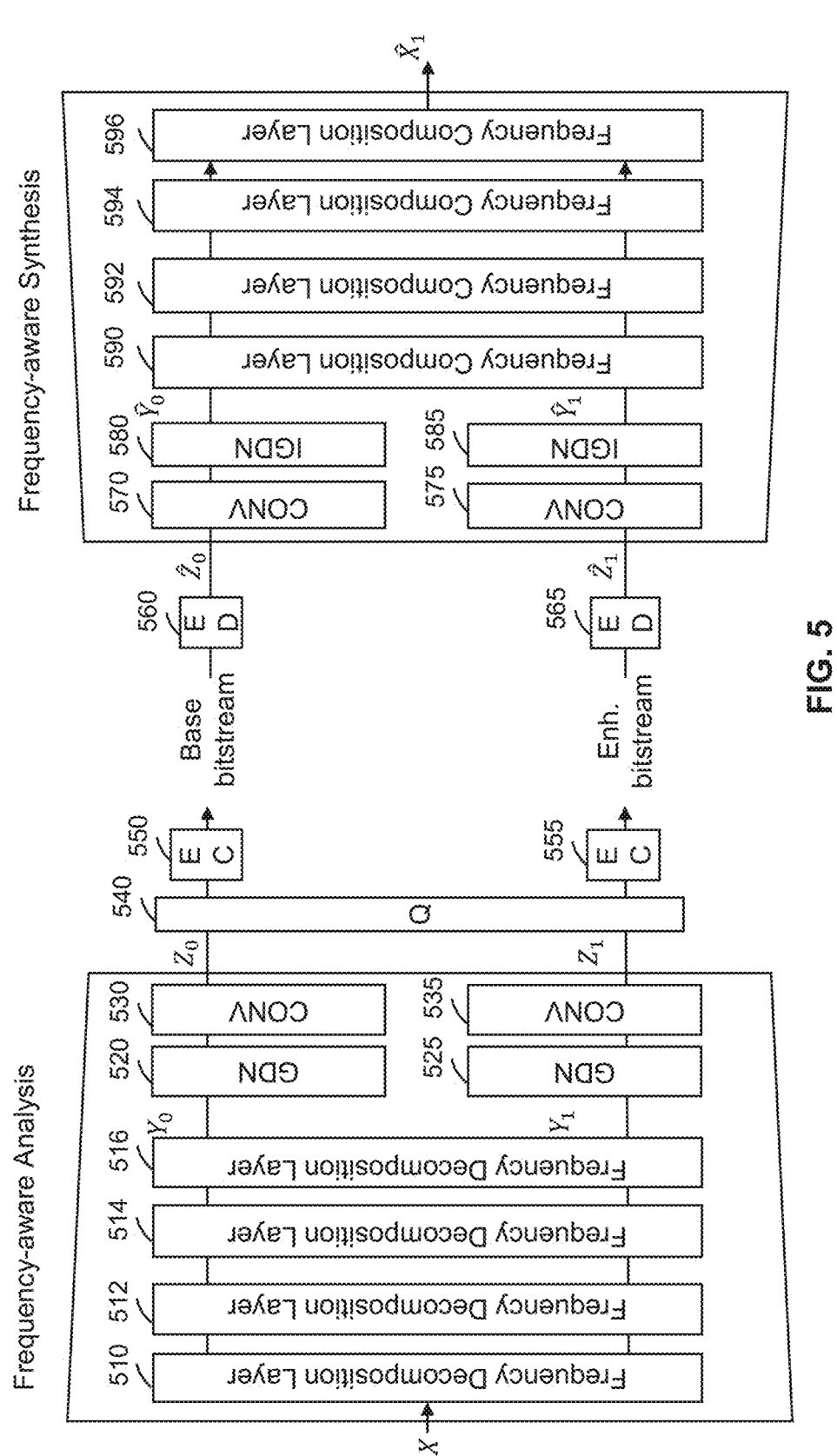
FIG. 5 illustrates a proposed compression method comprising the proposed encoder and decoder architectures, according to an embodiment.

FIG. 5 presents an embodiment of the proposed compression method comprising the proposed encoder and decoder architectures which enable the described two (sub) bitstream transmission. The frequency-aware analysis at the encoder takes an image X as input and transforms its content using Frequency Decomposition Layers (510, 512, 514, 516). The last Frequency Decomposition Layer (516) outputs the tensors $Y_0$ and $Y_1$, from which the two latent representations $Z_0$ and $Z_1$ are independently computed using a Generalized Divisive Normalization (GDN) layer (520, 525) followed by a convolutional layer (530, 535). These two latent representations, $Z_0$ and $Z_1$ are first quantized (540) separately, then entropy coded (550, 555) to generate a base bitstream and an enhancement bitstream, respectively.

At the decoder side, both bitstreams are entropy decoded (560, 570) to reconstruct the quantized latent representations $\hat{Z}_0$ and $\hat{Z}_1$, to be used as input to the Frequency-aware Synthesis module. Each latent representation undergoes an inverse computation, compared to the encoding stage, using a convolutional layer (570, 575) followed by an inverse GDN (IGDN, 580, 585). The resulting $\hat{Y}_0$ and $\hat{Y}_1$ are computed and used as input to the first Frequency Composition Layer (590). After going through several Frequency Composition Layers (590, 592, 594, 596), the decoder outputs a reconstruction $\hat{X}_1$.

Note that the receiver can decode the bitstream corresponding to the base layer only. In that case, the decoder replaces $\hat{Z}_1$ with an empty latent representation, i.e., whose elements are all zero, resulting in a tensor with the same dimension as $\hat{Z}_1$. The decoder then reconstructs the input with a base quality $\hat{X}_0$ only.

Frequency (De)Composition Layer

Before describing further details of the Frequency (De) composition layers, we briefly explain the typical process of wavelet transform which transforms the input in the pixel domain to frequencies in Spatial-Temporal Domain.

FIG. 6 illustrates an example of two-level wavelet transform. Through the frequency decomposition, input $X \in \mathbb{R}^{C \times H \times W}$ as shown in FIG. 6A, is first divided into four frequency sub-bands $\{X_{1,LL}, X_{1,LH}, X_{1,HL}, X_{1,HH}\}$ as shown in FIG. 6B. By the nature of the wavelet transform the height and width of the input are diminished by two, so the dimension of $X_{1,j}$ becomes $$C \times \frac{H}{2} \times \frac{W}{2}$$

where $j \in \{LL, LH, HL, HH\}$. LL band includes low frequency and HH band captures high frequency in both directions. LH band carries low frequency in horizontal but high frequency in vertical direction, whereas HL band captures high frequency in horizontal but low frequency in vertical direction. The next round of decomposition is usually done on $X_{1,LL}$ which is again divided into four sub bands $\{X_{2,LL}, X_{2,LH}, X_{2,HL}, X_{2,HH}\}$ as shown in FIG. 6C.

Figure 7A:
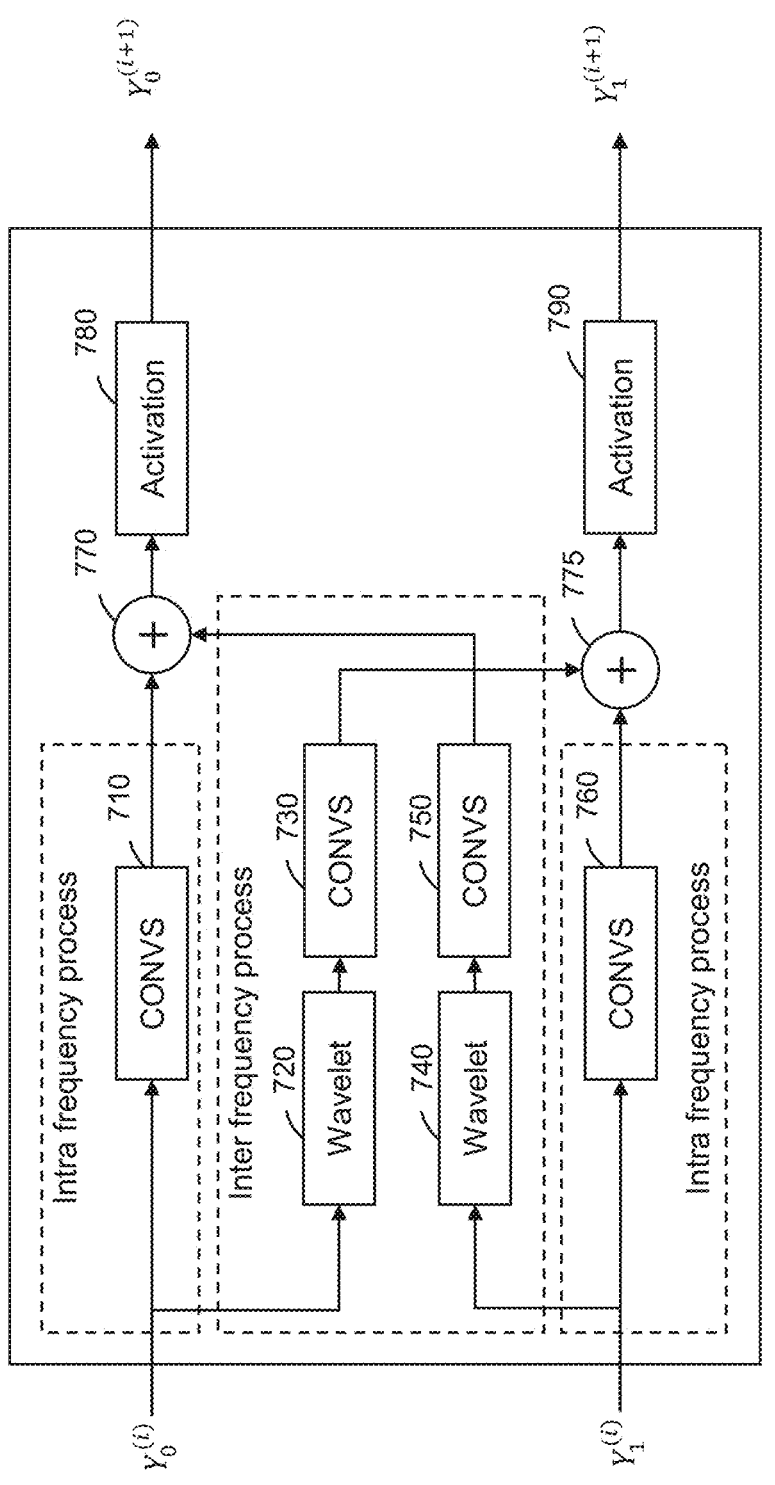
FIG. 7A illustrates a Frequency Decomposition (FD) layer when n=2, according to an embodiment.

FIG. 7A presents an embodiment of the Frequency Decomposition (FD) layer when n=2. Input of the i-th layer takes two groups of frequency data $$\{Y_0^{(i)}, Y_1^{(i)}\}.$$

In the special case when i=0, i.e., the input of the first layer corresponds to the input image X, the only input is $$Y_1^{(0)} = X$$

so the remaining $$Y_0^{(0)}$$

and its associated branches are ignored. For example, as shown in FIG. 7A, when i=0, the intra frequency process (710) and inter frequency process (720, 730) associated with $$Y_0^{(0)}$$

are ignored. However, based on $$Y_1^{(0)}, Y_0^{(1)}$$

is generated through inter frequency process (740, 750) associated with $$Y_1^{(0)},$$

and $$Y_1^{(1)}$$

is generated through intra frequency process (760) associated with $$Y_1^{(0)}.$$

For the other layers, $$\{Y_0^{(i)}, Y_1^{(i)}\}$$

are processed to generate the output $$\{Y_0^{(i+1)}, Y_1^{(i+1)}\}.$$

To generate the output at each layer, each input undergoes two different processes: Intra frequency process and Inter frequency process. The Intra frequency process computes some information with convolutional layer(s) (710, 760) to keep within the frequency group and passes over to the next frequency decomposition layer, whereas the inter frequency process computes the frequency information to exchange between different frequency groups.

As shown in FIG. 7A, $$Y_0^{(i)} \text{ and } Y_1^{(i)}$$

are explicitly processed by a frequency decomposition transform using non-learned transforms such as Wavelet transform, Fourier transform, Discrete Cosine transform, etc. or a trainable form of these conventional transforms followed by typical convolutional layer(s) in the "inter frequency process" to exchange frequency information between $$Y_0^{(i)} \text{ and } Y_1^{(i)}.$$

More particularly, as shown in FIG. 7A, $$Y_0^{(i)} \text{ and } Y_1^{(i)}$$

are used as input to the wavelet transform (720, 740) followed by convolutional layer(s) (730, 750) for the inter frequency process, then its outputs flow into its neighboring groups to be added (770, 775) to the corresponding output of the intra frequency process with convolutional layer(s). In different wavelet transform modules (e.g., 720, 740), different wavelet transforms can be used or they output different combinations of frequency bands. For example, for Wavelet (740) with 2-D Discrete Haar Wavelet Transform, only High-High (HH) band is passed to the next layer. For Wavelet (720) with the same coefficients, only Low-Low (LL) band is passed to the next layer. In different convolutional layers (e.g., 730, 750), different parameters can be used. The summed outputs are then separately processed with activation function (780, 790) to generate output $$Y_0^{(i+1)} \text{ and } Y_1^{(i+1)}.$$

The activation function can be any types of non-liner function or even linear function. Moreover, the activation function (780) can be different from the other activation function (790).

In this example, the wavelet transform (720) using $$Y_0^{(i)}$$

as input can only compute the frequency information corresponding to the LL band and further processes the LL frequencies as input to the subsequent convolutional layer(s) to pass it over to the other frequency group. Depending on the learned filters for the convolutional layer(s), the computed information can be subtracted from or added to the neighboring frequency group.

Likewise, the wavelet transform (740) using $$Y_1^{(i)}$$

as input can only compute frequency information corresponding to HH band and further processes the HH frequencies as input to the subsequent convolutional layer(s) to pass it over to the other frequency group. Depending on the learned filters for the convolutional layer(s), the computed information can be subtracted from or added to the neighboring frequency group.

Figure 7B:
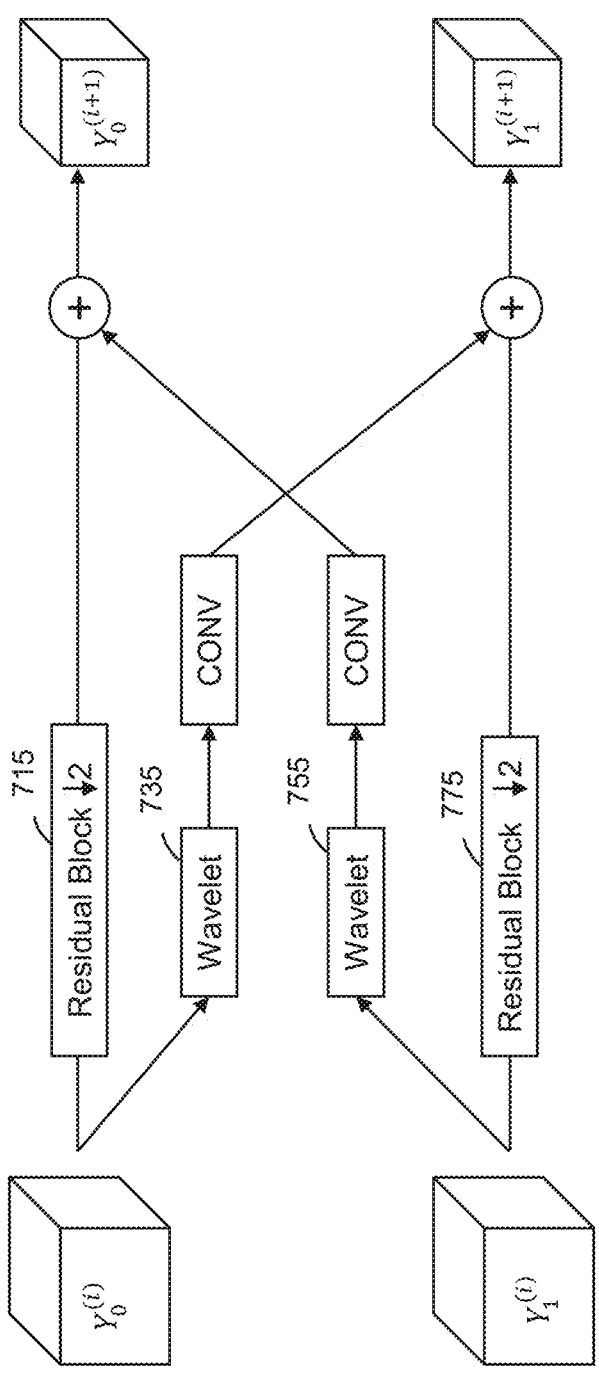
FIG. 7B describes an implementation of the Frequency Decomposition Layer.

FIG. 7B describes an implementation of the Frequency Decomposition Layer. The inputs and the outputs are depicted as 3-D cubes since they usually correspond to 3D tensors. To make the intra frequency process computation more precise, Residual Blocks (715, 775) are used. Originally, the residual blocks were introduced as part of the ResNet architecture and there exist various configurations of layers constructing the residual blocks. The residual block connects the output of one layer with the input of the block through a skip-connection that learn residual functions with reference to the layer inputs, instead of learning unreferenced functions. In this implementation, the skip-connection consists of a couple of convolutional layers and activation functions in way to preserve some of the information which would be lost when using non-residual block with single branch with regular convolutional layers. However, the proposed methods do not put any restriction on the configurations of layers for the residual blocks. Since the Residual Block uses a stride of 2 and the Wavelet operation (735, 755) reduces the resolution of input by half in width and height, the resulting size of the output is smaller than the input. Also, in this implementation, there is no activation function, which is theoretically identical to linear activation layer, following the addition operation that combines the output of the intra- and inter-frequency processing.

Figure 7C:
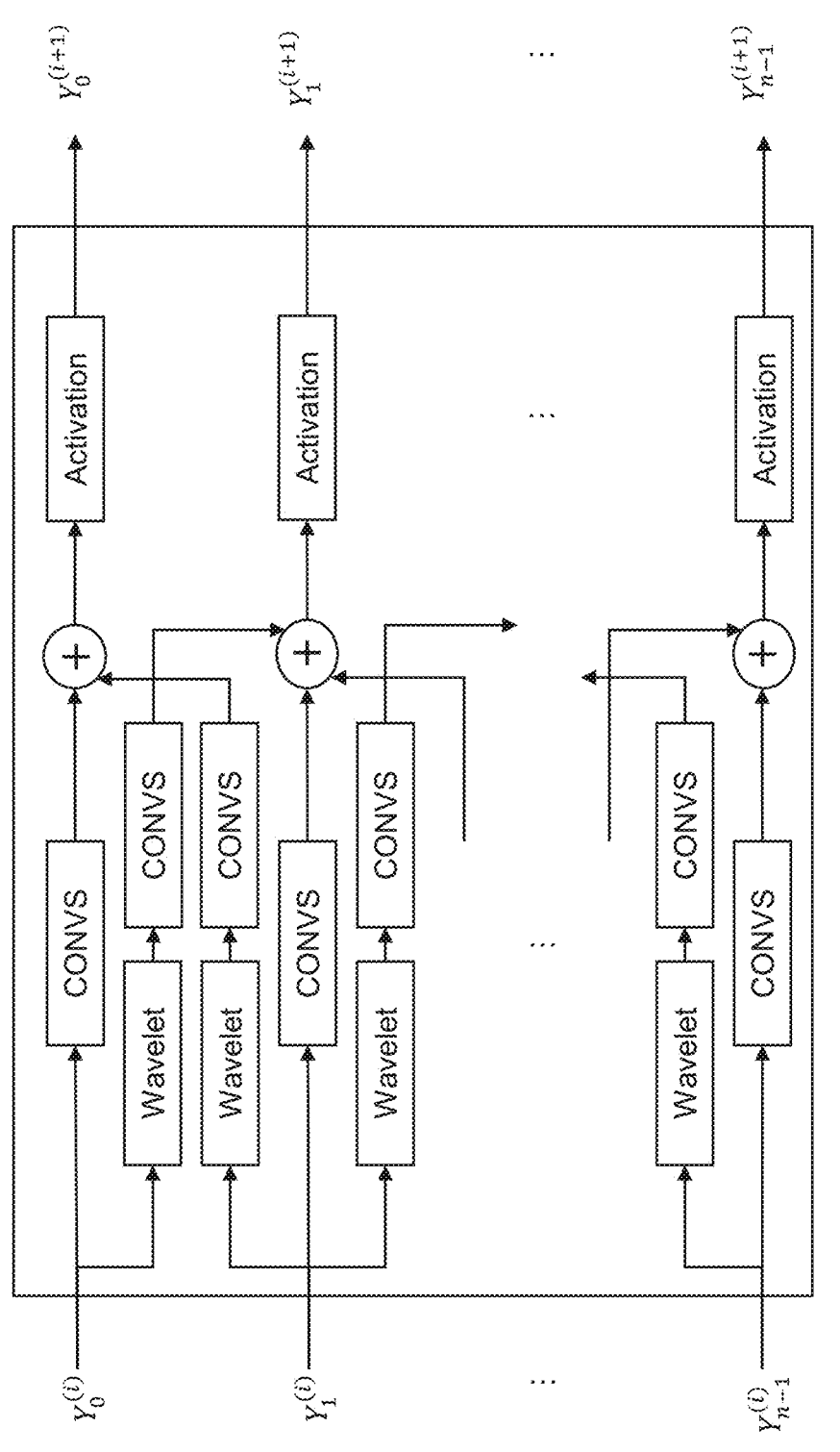
FIG. 7C illustrates a generalized Frequency Decomposition layer, according to an embodiment.

FIG. 7C presents an embodiment of a generalized Frequency Decomposition (FD) layer. Input of the i-th layer corresponds to the set of grouped frequencies $$\{Y_0^{(i)}, Y_1^{(i)}, \dots, Y_{n-1}^{(i)}\}.$$

When i=0, it corresponds to the first layer interfacing with the input image X which is the only input for $$Y_{n-1}^{(0)}.$$

Then, the remaining inputs and associated branches are ignored. After the first layer, whole inputs $$\{Y_0^{(i)}, Y_1^{(i)}, \dots, Y_{n-1}^{(i)}\}$$

of the i-th layer are processed to generate the output $$\{Y_0^{(i+1)}, Y_1^{(i+1)}, \dots, Y_{n-1}^{(i+1)}\}$$

to use them as input to the next i+1-th layer. At the middle of inputs, the computed frequency information exchanges between both upper and lower groups. Therefore, for instance, $$Y_k^{(i)}(k = \{0, 1, \ldots, n-1\})$$

with smaller k carries lower frequencies than greater k, which is learned through consecutive FD layers during training.

Regarding the wavelet modules, they can be implemented using a convolutional layer with non-trainable kernel(s) of traditional wavelet transform coefficients. For instance, the wavelet module for low frequencies can adopt a convolutional layer with a kernel whose elements are all one over the kernel size to capture DC frequency of input. For the wavelet module to capture high frequencies, more sophisticatedly designed wavelet transform coefficients (non-trainable) can be used as kernel(s) for a convolutional layer.

Figure 8A:
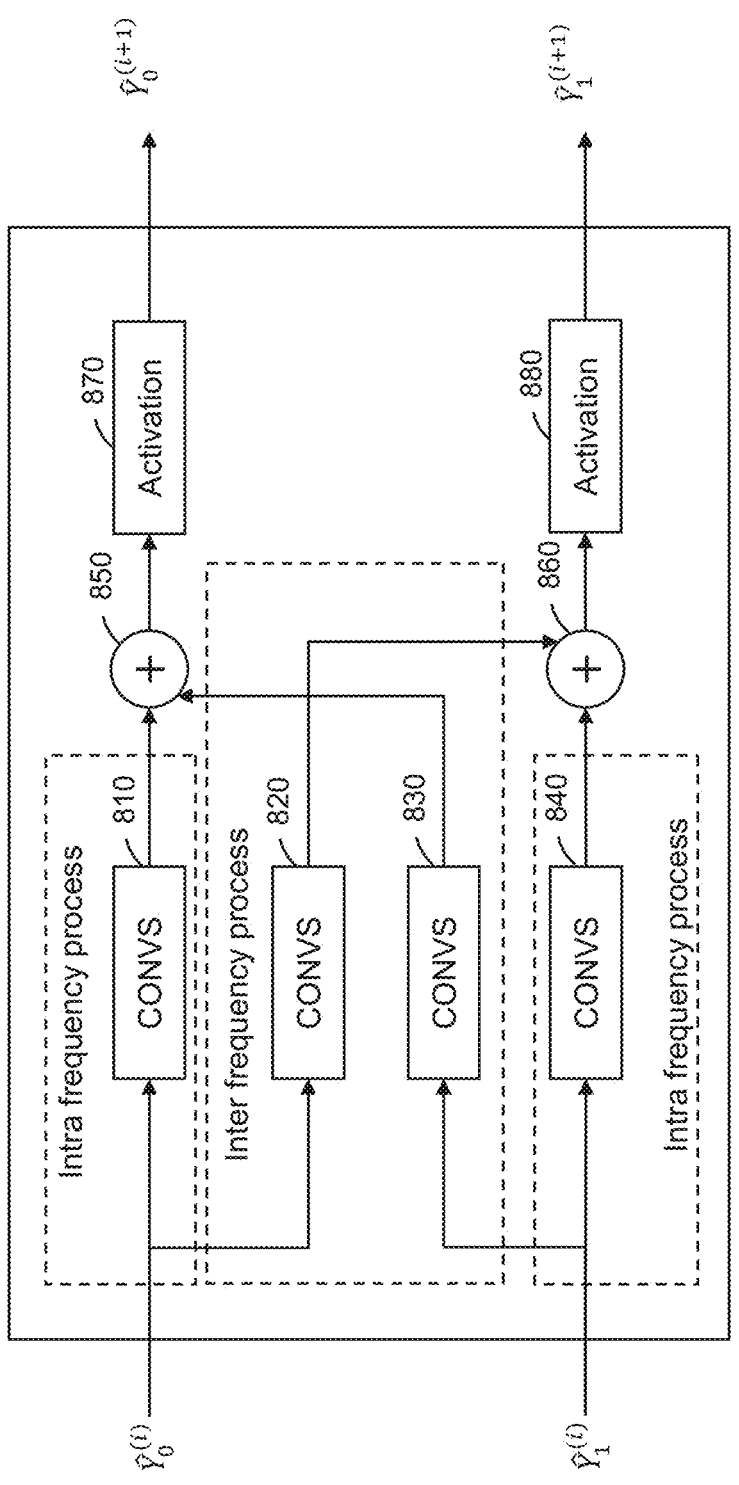
FIG. 8A illustrates a Frequency Composition (FC) layer when n=2, according to an embodiment.

FIG. 8A presents an embodiment of the Frequency Composition (FC) layer when n=2. Input of the i-th layer takes two groups of frequencies $$\{\hat{Y}_0^{(i)}, \hat{Y}_1^{(i)}\}.$$

In special case when i=3 in FIG. 5 in which the layer is supposed to generate output, $$Y_1^{(3)}$$

is always the desired output $\hat{X}_k$ where k={0,1}.

To generate the output at each layer, each input undergoes two different processes: Intra frequency process and Inter frequency process. The Intra frequency process computes some information with convolutional layer(s) (810, 840) to keep within the frequency group and passes over to the next frequency composition layer, whereas the inter frequency process (820, 840) computes the frequency information to exchange (850, 860) between different frequency groups. As shown in FIG. 8A, $$Y_0^{(i)} \text{ and } Y_1^{(i)}$$

are processed by convolutional layer(s) in the inter frequency process to exchange frequency information between $$Y_0^{(i)} \text{ and } Y_1^{(i)}.$$

In different convolutional layers (e.g., 820, 830), different parameters can be used. The summed outputs are then separately processed with activation function (870, 880) to generate output $$Y_0^{(i+1)} \text{ and } Y_1^{(i+1)}.$$

Figure 8B:
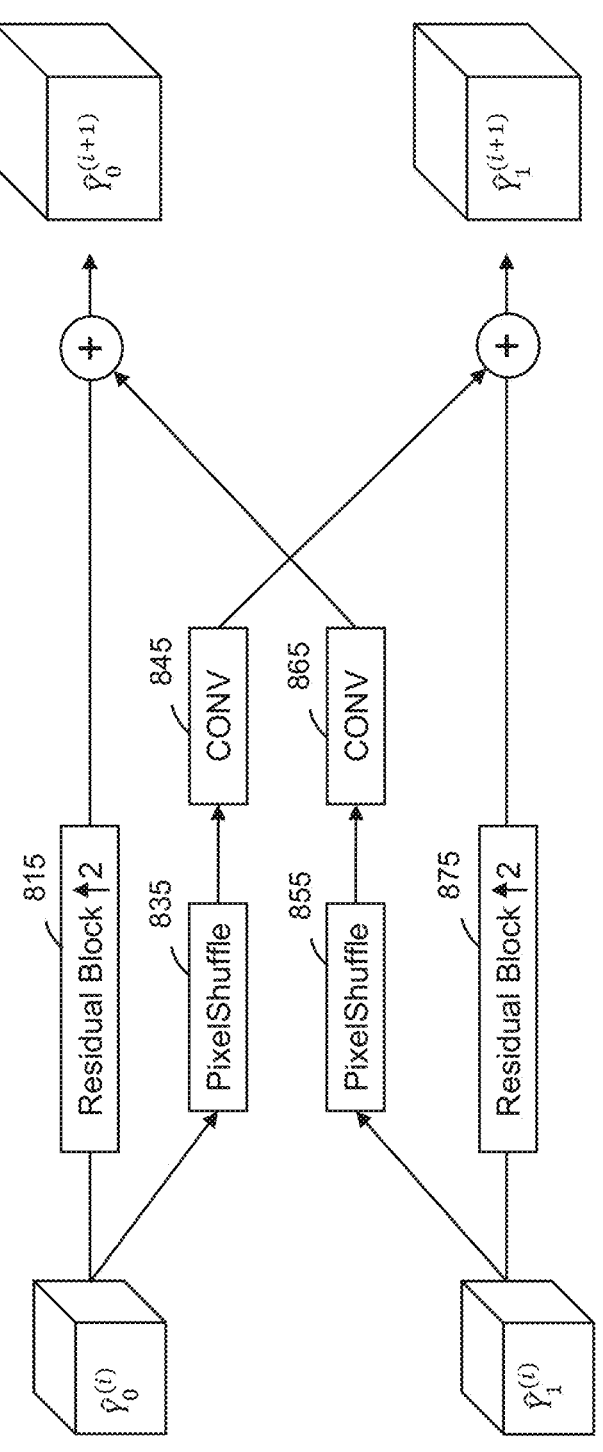
FIG. 8B describes an implementation of the proposed Frequency Composition Layer.

FIG. 8B describes an implementation of the proposed Frequency Composition Layer. In the inter-frequency process, PixelShuffle (835, 855, see an article by W. Shi, et al., "Real-time single image and video super-resolution using an efficient sub-pixel convolutional neural network," in Proc. IEEE CVPR, 2016, pp. 1874-1883) followed by a convolutional layer (845, 865) are used to upsample the input by a factor 2, considering multiple frequency features across channels. Since the Residual Block with upsampling operation (815, 875) and the PixelShuffle layers double the resolution of input, the size of the output is larger than the input. Like in the Decomposition Layer, there is no activation layer, which is theoretically identical to linear activation layer, following the adding operation that sums up the output of the intra- and inter-frequency processing.

In an example, in case when only $\hat{Z}_0$ is input of the decoder in FIG. 5, the proposed decoder considers the remaining inputs as a constant value (e.g., zero), so the entire branches are involved to compute the output. Unlike the FD layer, there is no explicit use of engineered transform, as convolutional layer(s) can figure out how to synthesize the output correctly while training with regard to a given optimization function.

Figure 8C:
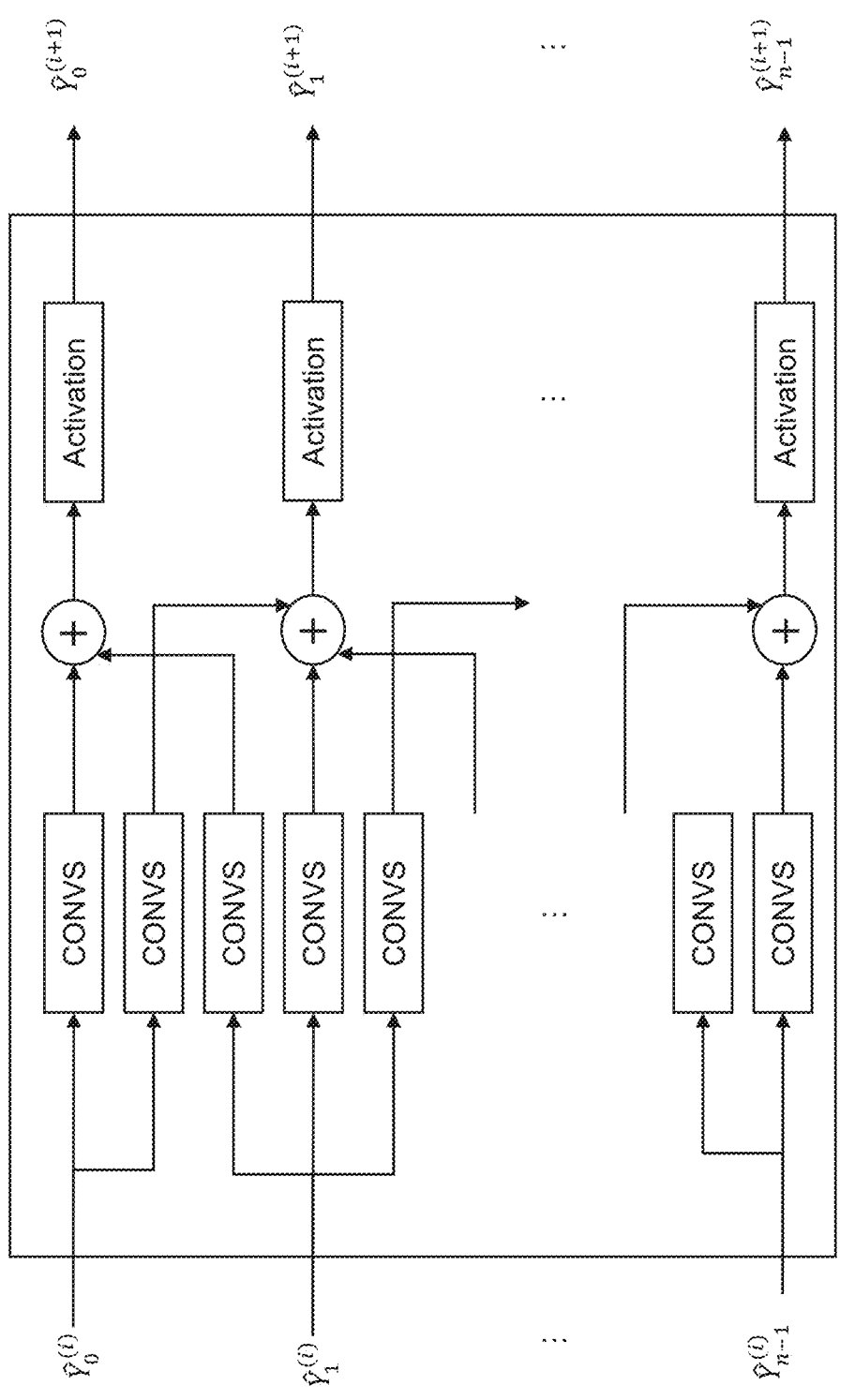
FIG. 8C illustrates a generalized Frequency Composition layer, according to an embodiment.
Figure 9B:
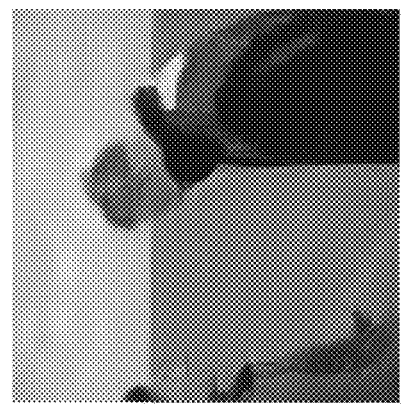
FIG. 9A illustrates decoding with $\hat{Z}_0$ as input and FIG. 9B illustrates the generated lower quality output $\hat{X}_0$.
Figure 9D:
FIG. 9C illustrates decoding when both $\hat{Z}_0$ and $\hat{Z}_1$ are available at the decoder and FIG. 9D illustrates output $\hat{X}_1$ with improved quality.
Figure 9A:
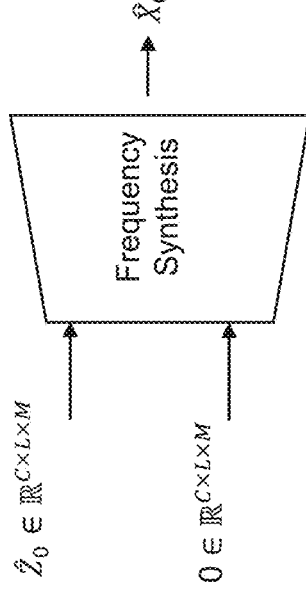
Figure 9C:
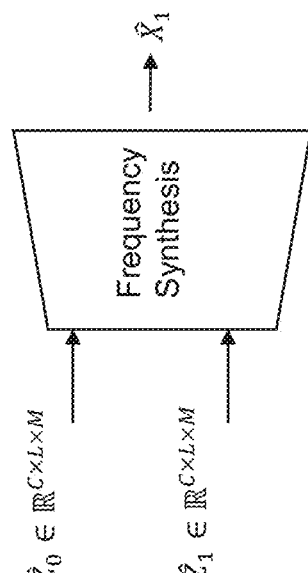

FIG. 8C presents an embodiment of generalized Frequency Composition (FC) layer. Input of the i-th layer is the set of grouped frequencies $$\{\hat{Y}_0^{(i)}, \hat{Y}_1^{(i)}, \ldots, \hat{Y}_{n-1}^{(i)}\}.$$

When i=3 in FIG. 5 in which the layer is supposed to generate output, $$Y_1^{(3)}$$

is always the desired output $\hat{X}_k$ where k={0, 1, . . . , n−1}. For example, in case when only $\hat{Z}_0$ is input of the decoder in FIG. 5, our proposed decoder considers the remaining inputs as a constant value (e.g., zero), so the entire branches are involved to compute the output. After the first layer, whole inputs $$\{\hat{Y}_0^{(i)}, \hat{Y}_1^{(i)}, \ldots, \hat{Y}_{n-1}^{(i)}\}$$

of the i-th layer are processed to generate the output $$\{\hat{Y}_0^{(i+1)}, \hat{Y}_1^{(i+1)}, \ldots, \hat{Y}_{n-1}^{(i+1)}\}$$

to use them as input to the next i+1-th layer. At the middle of inputs, the computed frequency information exchanges between both upper and lower groups to synthesize the output image.

Scalability (or Progressive Decoding)

FIG. 9 illustrates an example of two-layer quality scalability, according to an embodiment. The decoding with $\hat{Z}_0$ as input transmitted only from the encoder, as shown in FIG. 9A, generates the lower quality output $\hat{X}_0$, as illustrated in FIG. 9B, while all latent variables in $\hat{Z}_1$ are assigned zeros. When both $\hat{Z}_0$ and $\hat{Z}_1$ are available at the decoder, as shown in FIG. 9C, the decoding of the enhancement $\hat{Z}_1$ together with $\hat{Z}_0$ as input improves the quality of the output, denoted $\hat{X}_1$ as illustrated in FIG. 9D. Thus, the same decoder architecture is used for different quality levels. To be clear for the input when offering scalability, at the decoder side, all input ports of a FC should be enabled but the elements of the input can be zeros (for the first FC layer) or vary depending on the extent of the quality of the desired output image.

Quality Enhancement at Region of Interest

Figures 10A, 10B, 10C:
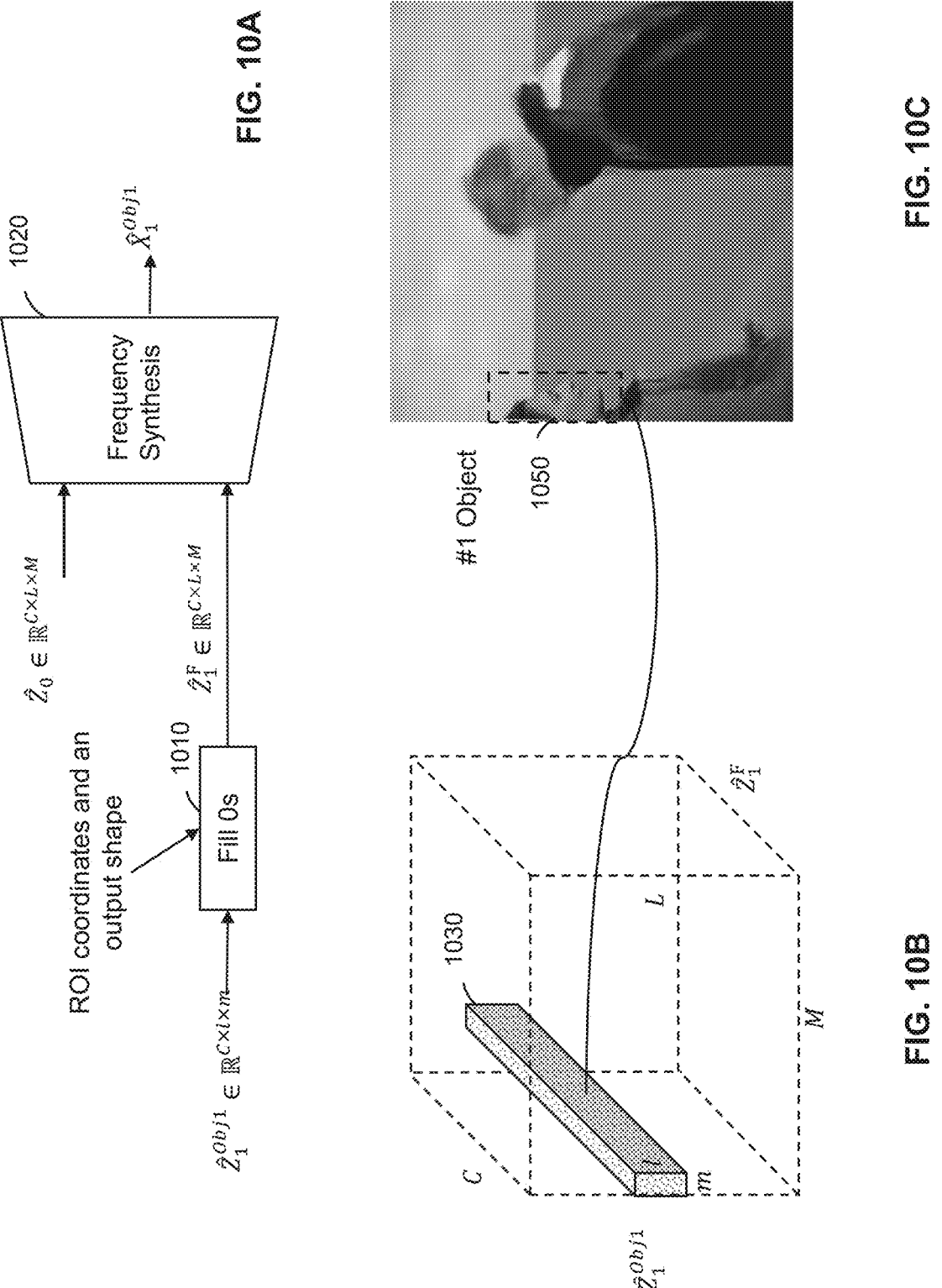
FIG. 10A illustrates ROI (Region of Interest) handling at the frequency synthesis stage, according to one embodiment.
FIG. 10B illustrates the coded latent variables comprising the part in $$\hat{Z}_1^{Obj1};$$
FIG. 10C illustrates the ROI in the picture.

In one embodiment, we propose to improve the quality of at least one Region of Interest (ROT) by encoding and transmitting only the part of latent representation $\hat{Z}_1$ corresponding to a ROI in the image/video (e.g., the face area, denoted as #1 Object 1050 in FIG. 10C). As such, the decoder receives only the coded latent variables comprising the part in $$\hat{Z}_1^{Obj1}$$

(1030) as shown in FIG. 10B, where C×l×m is the dimension of a tensor corresponding to the object #1 in latent space. To properly use $$\hat{Z}_1^{Obj1}$$

as input to the Frequency Synthesis stage, remaining latent variables are set to 0 (1010), as shown in FIG. 10A. Therefore, a tensor $$\hat{Z}_1^F$$

with size of C×L×M are fed into the Frequency Synthesis (1020) to reconstruct the input image with the enhanced ROT for #1 Object $$\hat{X}_1^{Obj1}.$$

Signaling for ROI

Figures 11A, 11B:
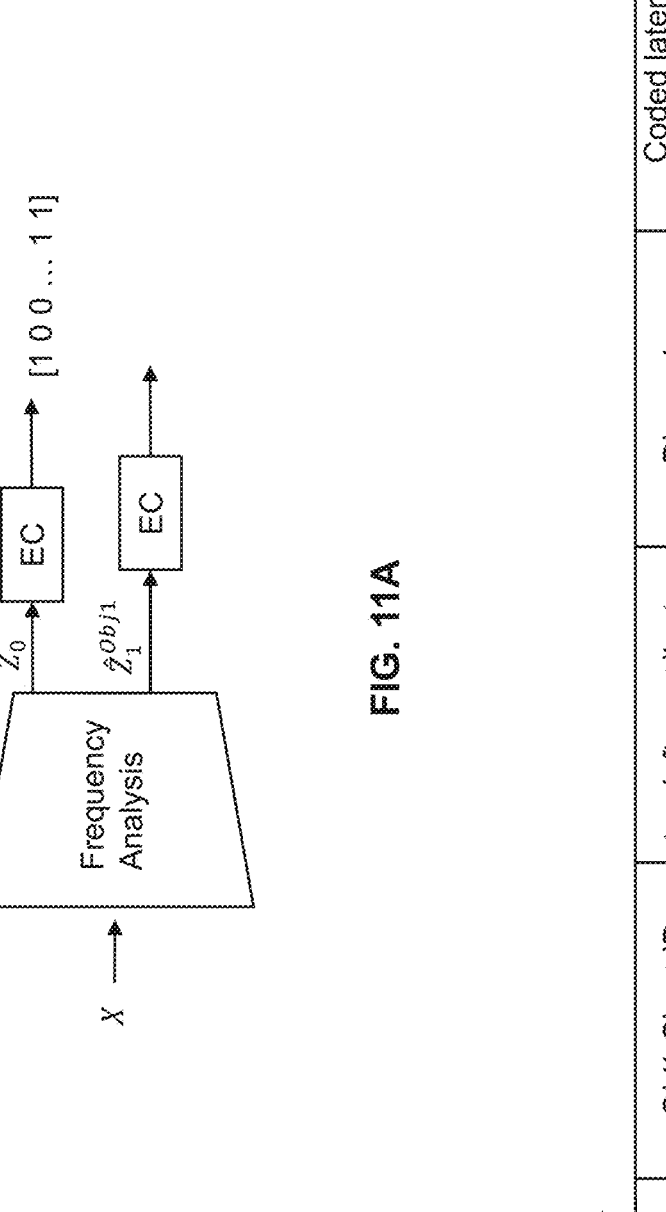
FIG. 11A illustrates enhancement information for #1 object is coded as $$\hat{Z}_1^{Obj1};$$
FIG. 11B illustrates signaling of ROI information.

There are several ways to indicate ROT information needed for the decoder to reform the input tensor to be used as input to the Frequency Synthesis decoder. In one embodiment, when enhancement information for #1 object is coded as $$\hat{Z}_1^{Obj1}$$

as shown in FIG. 11A, a proposed method consists in explicitly signaling semantic information including corresponding location information of $$\hat{Z}_1^{Obj1}$$

in the original dimension of the latent representation $\hat{Z}_1$, the tensor dimension of $$\hat{Z}_1^{Obj1},$$

and potentially additional semantic information (e.g., object category or class ID) if needed in the coded bitstream as presented in FIG. 11B. Therefore, coded ROT information in the bitstream for $$\hat{Z}_1^{Obj1}$$

is parsed at the decoder and used to specify the location of the reconstructed latent representation $$\hat{Z}_1^{Obj1}$$

in the dimension of the latent representation $$\hat{Z}_1^F.$$

Figures 12A, 12B:
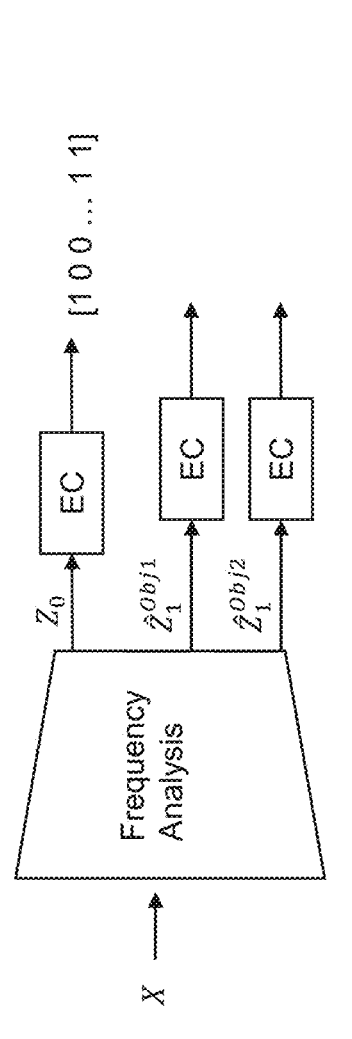
FIG. 12A illustrates enhancement information for #1 object and #2 object is coded as $$\hat{Z}_1^{Obj1} \text{ and } \hat{Z}_1^{Obj2};$$
FIG. 12B illustrates signaling of ROI information.

It is also possible to code and transmit another enhancement data $$\hat{Z}_1^{Obj2}$$

for another ROT of the second object in a separate bitstream as shown in FIG. 12A. In that case, common information such as the dimensions of the original tensor can refer to the previous coded data for $$\hat{Z}_1^{Obj1},$$

as shown in FIG. 12B.

Figure 13A:
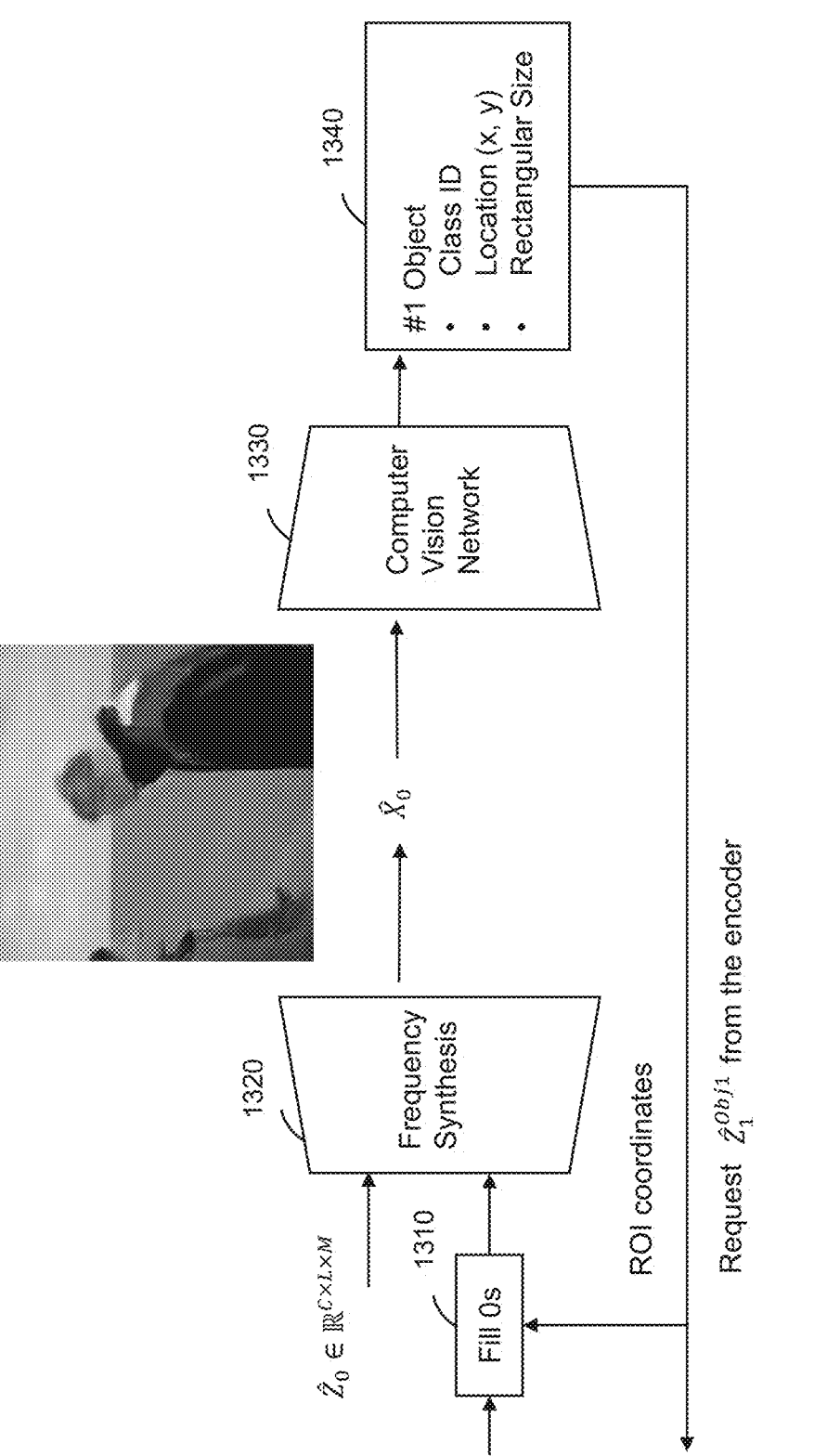
FIG. 13A illustrates that latent variables $$\hat{Z}_1^{Obj1}$$

In another embodiment, only the corresponding latent variables $$\hat{Z}_1^{Obj1}$$

are requested from the encoder based on inference results ran on go in the decoder as shown in FIG. 13A. In this scenario, the receiver system including decoder (1320) and computer vision algorithm (or network, 1330) that signals the location information at original input scale and the size of ROI (1340) to the encoder. Then, the encoder only compresses the corresponding latent variables $$\hat{Z}_1^{Obj1}.$$

Then, the ROI information is also used in the decoder when receiving the coded latent variables $$\hat{z}_1^{Obj1}$$

to properly fill remaining latent variables with zeros (1310) and build the input tensor $$\hat{z}_1^F.$$

Figure 13B:
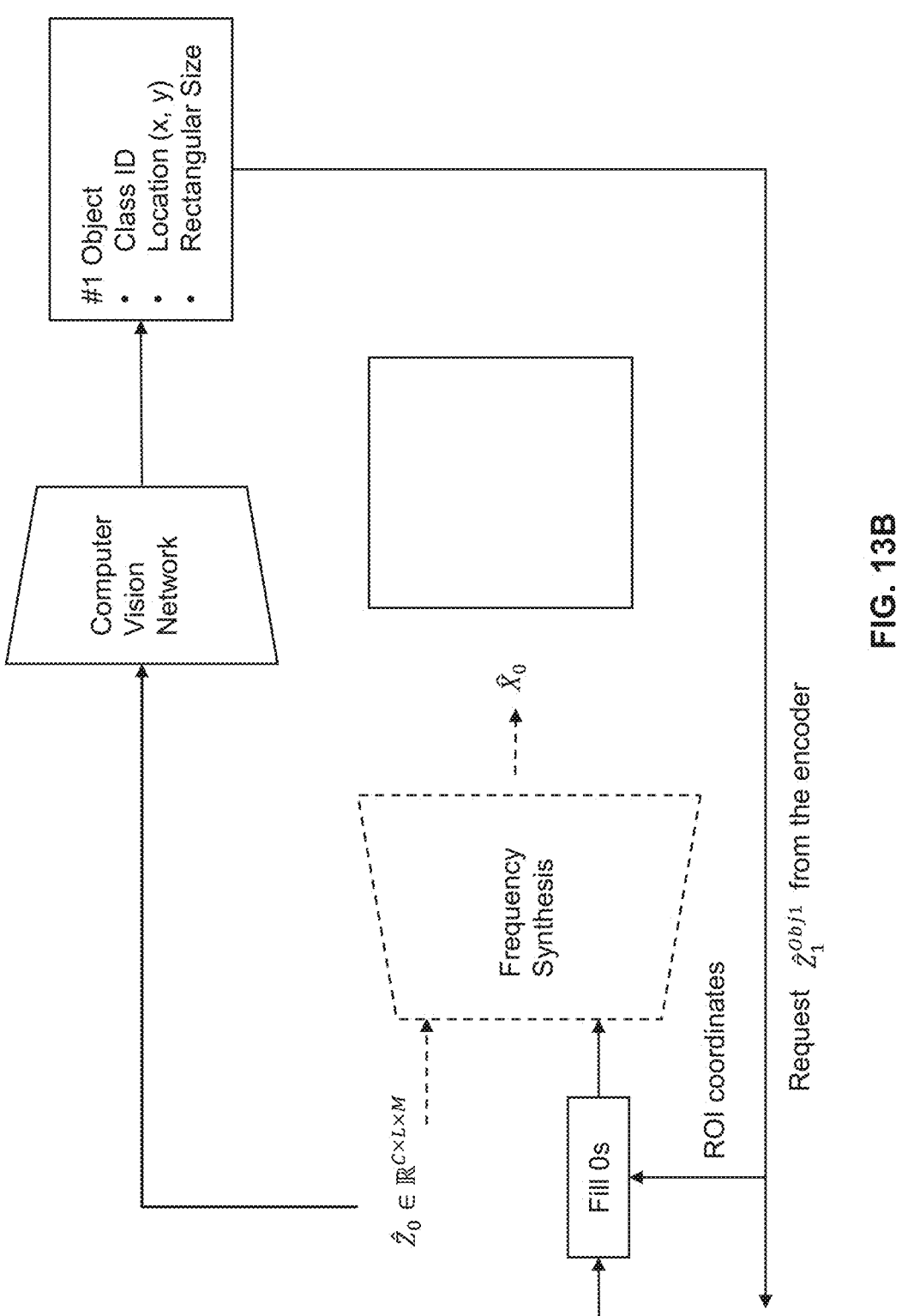
FIG. 13B illustrates that latent variables $$\hat{Z}_1^{Obj1}$$

In another embodiment, it is proposed to avoid reconstructing $\hat{X}_0$ but operate inference directly using $\hat{Z}_0$ as input to a properly trained Computer Vision Network. Therefore, the receiver system still signals the location of the ROI and its area size to the encoder. Accordingly, the encoder compresses the corresponding latent variables and transmits the coded latent variables to the decoder as shown in FIG. 13B.

Various numeric values are used in the present application. The specific values are for example purposes and the aspects described are not limited to these specific values.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various implementations involve decoding. "Decoding," as used in this application, may encompass all or part of the processes performed, for example, on a received encoded sequence in order to produce a final output suitable for display. In various embodiments, such processes include one or more of the processes typically performed by a decoder, for example, entropy decoding, inverse quantization, and inverse transformation. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input video sequence in order to produce an encoded bitstream.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method of video encoding, comprising:

decomposing at least a part of an image into a plurality of frequency groups by a plurality of decomposition layers, wherein each decomposition layer performs an intra frequency process and an inter frequency process, and wherein a frequency group corresponds to a set of frequency bands;

generating a respective latent representation in a latent space for each frequency group of said plurality of frequency groups; and entropy encoding one or more of said respective latent representations.

2. The method of claim 1, wherein said intra frequency process is performed by a set of convolutional layers.

3. The method of claim 1, wherein said inter frequency process comprises:

performing a frequency decomposition transform on an input data set associated with a frequency group, followed by one or more convolutional layers to form an output data set; and adding said output data set to a result of an intra frequency process for another frequency group neighboring to said frequency group.

4. The method of claim 1, further comprising:

signaling location information of at least a region of interest of said image.

5. A method of video decoding, comprising:

obtaining one or more latent representations in a latent space, wherein each of said one or more latent representations corresponds to a frequency group of one or more frequency groups, wherein a frequency group corresponds to a set of frequency bands;

obtaining said one or more frequency groups from said one or more latent representations; and composing at least a part of an image from said one or more frequency groups by a plurality of frequency composition layers, wherein each frequency composition layer performs an intra frequency process and an inter frequency process.

6. The method of claim 5, wherein said intra frequency process is performed by a set of convolutional layers.

7. The method of claim 5, wherein said inter frequency process is performed by a set of convolutional layers.

8. The method of claim 5, further comprising:

obtaining another one or more latent representations in said latent space; and obtaining another one or more frequency groups from said another one or more latent representations, wherein said at least a part of said image is composed further based on said another one or more frequency groups.

9. The method of claim 8, wherein said another one or more latent representations associated with another one or more frequency groups are set to a constant value.

10. The method of claim 5, further comprising:

receiving location information of at least a region of interest of said image.

11. An apparatus, comprising one or more processors and at least one memory coupled to said one or more processors, wherein said one or more processors are configured to:

decompose at least a part of an image into a plurality of frequency groups by a plurality of decomposition layers, wherein each decomposition layer performs an intra frequency process and an inter frequency process, and wherein a frequency group corresponds to a set of frequency bands;

generate a respective latent representation in a latent space for each frequency group of said plurality of frequency groups; and entropy encode one or more of said respective latent representations.

12. The apparatus of claim 11, wherein said intra frequency process is performed by a set of convolutional layers.

13. The apparatus of claim 11, wherein said inter frequency process comprises:

performing a frequency decomposition transform on an input data set associated with a frequency group, followed by one or more convolutional layers to form an output data set; and adding said output data set to a result of an intra frequency process for another frequency group neighboring to said frequency group.

14. The apparatus of claim 11, wherein said one or more processors are further configured to:

signal location information of at least a region of interest of said image.

15. An apparatus, comprising one or more processors and at least one memory coupled to said one or more processors, wherein said one or more processors are configured to:

obtain one or more latent representations in a latent space, wherein each of said one or more latent representations corresponds to a frequency group of one or more frequency groups, wherein a frequency group corresponds to a set of frequency bands;

obtain said one or more frequency groups from said one or more latent representations; and compose at least a part of an image from said one or more frequency groups by a plurality of frequency composition layers, wherein each frequency composition layer performs an intra frequency process and an inter frequency process.

16. The apparatus of claim 15, wherein said intra frequency process is performed by a set of convolutional layers.

17. The apparatus of claim 15, wherein said inter frequency process is performed by a set of convolutional layers.

18. The apparatus of claim 15, wherein said one or more processors are further configured to:

obtain another one or more latent representations in said latent space; and obtain another one or more frequency groups from said another one or more latent representations, wherein said at least a part of said image is composed further based on said another one or more frequency groups.

19. The apparatus of claim 18, wherein said another one or more latent representations associated with another one or more frequency groups are set to a constant value.

20. The apparatus of claim 15, wherein said one or more processors are further configured to:

receive location information of at least a region of interest of said image.

* * * * *